(12) United States Patent
Kumar et al.

(10) Patent No.: US 11,365,704 B2
(45) Date of Patent: Jun. 21, 2022

(54) DIRECTIONALLY TARGETED JET NOISE REDUCTION SYSTEM AND METHOD

(71) Applicants: Sunil Kumar, New York, NY (US); Pankaj H. Rajput, Abu Dhabi (AE)

(72) Inventors: Sunil Kumar, New York, NY (US); Pankaj H. Rajput, Abu Dhabi (AE)

(73) Assignee: NEW YORK UNIVERSITY IN ABU DHABI CORPORTION, Abu Dhabi (AE)

( * ) Notice: Subject to any disclaimer, the term of this patent is extended or adjusted under 35 U.S.C. 154(b) by 437 days.

(21) Appl. No.: 16/287,200

(22) Filed: Feb. 27, 2019

(65) Prior Publication Data

US 2019/0264636 A1 Aug. 29, 2019

Related U.S. Application Data

(60) Provisional application No. 62/671,818, filed on May 15, 2018, provisional application No. 62/635,977, filed on Feb. 27, 2018.

(51) Int. Cl.
| | |
|---|---|
| *F02K 1/34* | (2006.01) |
| *G10K 11/16* | (2006.01) |
| *F02K 1/46* | (2006.01) |
| *G10K 11/175* | (2006.01) |

(52) U.S. Cl.
CPC ............... *F02K 1/34* (2013.01); *F02K 1/46* (2013.01); *G10K 11/161* (2013.01); *G10K 11/175* (2013.01)

(58) Field of Classification Search
CPC ........... F02K 1/34; F02K 1/46; G10K 11/161; G10K 11/175
See application file for complete search history.

(56) References Cited

U.S. PATENT DOCUMENTS

| | | | | |
|---|---|---|---|---|
| 2,990,905 | A | * 7/1961 | Lilley | F02K 1/34 181/220 |
| 3,905,445 | A | * 9/1975 | Scharton | F01N 13/082 181/213 |
| 4,168,763 | A | * 9/1979 | White | B64F 1/26 181/218 |

(Continued)

OTHER PUBLICATIONS

Alkislar, Mehmet B. et al., "The effect of streamwise vortices on the aeroacoustics of a Mach 0.9 jet" Journal of Fluid Mechanics, vol. 578, pp. 139-169, 2007.

(Continued)

*Primary Examiner* — Jeremy A Luks
(74) *Attorney, Agent, or Firm* — Hunton Andrews Kurth LLP

(57) ABSTRACT

An exemplary engine noise reduction system, can be provided, which can include a noise reduction fluid source, and a microjet(s) placed at an axial location downstream from a nozzle exit of an engine and configured to asymmetrically inject a noise reduction fluid from the noise reduction fluid source into a jet flow of the engine. The engine can be a jet engine. The microjet(s) can include four microjets, which can be about 90 degrees apart in a plane at the axial location. The four microjets can be asymmetric microjets. The microjet(s) can be configured to inject the noise reduction fluid in a direction that is normal with respect to the jet flow.

25 Claims, 17 Drawing Sheets

(56) References Cited

U.S. PATENT DOCUMENTS

| | | | | | |
|---|---|---|---|---|---|
| 4,398,667 | A | * | 8/1983 | Maestrello | F02K 1/34 239/265.17 |
| 4,474,259 | A | * | 10/1984 | Wright | F02K 1/46 181/213 |
| 7,159,383 | B2 | * | 1/2007 | Barton | B64D 33/06 239/265.19 |
| 7,412,832 | B2 | * | 8/2008 | Gutmark | F02K 1/34 60/204 |
| 7,966,826 | B2 | * | 6/2011 | Alkislar | F02K 1/386 60/770 |
| 8,020,368 | B2 | * | 9/2011 | Bonnet | F02K 1/34 60/262 |
| 8,157,050 | B2 | * | 4/2012 | Huber | F02K 1/46 181/220 |
| 8,393,139 | B2 | * | 3/2013 | Huber | F02K 1/34 60/264 |
| 8,640,820 | B2 | * | 2/2014 | Caeti | F02K 1/34 181/213 |
| 8,770,921 | B2 | * | 7/2014 | Huber | F02K 1/34 415/116 |
| 8,813,907 | B2 | * | 8/2014 | Tanaka | F02K 1/34 181/240 |
| 8,904,795 | B2 | * | 12/2014 | Oishi | F02K 1/44 60/725 |
| 9,151,244 | B2 | * | 10/2015 | Huber | B64D 33/06 |
| 9,261,047 | B2 | * | 2/2016 | Domel | F02K 1/383 |
| 9,528,468 | B2 | * | 12/2016 | Tanaka | F02K 1/44 |
| 9,551,297 | B2 | * | 1/2017 | Domel | F02K 1/383 |
| 9,885,315 | B2 | * | 2/2018 | Vuillemin | F02K 1/46 |
| 10,794,329 | B2 | * | 10/2020 | Baruzzini | F02K 1/28 |
| 2003/0182925 | A1 | * | 10/2003 | Lair | F02K 3/04 60/226.1 |
| 2004/0088967 | A1 | * | 5/2004 | Webster | F02K 1/34 60/204 |
| 2005/0091963 | A1 | * | 5/2005 | Li | F02K 1/36 60/262 |
| 2006/0283188 | A1 | * | 12/2006 | Webster | F02K 1/34 60/770 |
| 2010/0037587 | A1 | * | 2/2010 | Vauchel | F02K 1/46 60/226.2 |
| 2014/0373550 | A1 | * | 12/2014 | Vuillemin | F02K 3/06 60/770 |

OTHER PUBLICATIONS

Arakeri, V.H. et al., "Aeroacoustics of a Mach 0.9 jet with Chevron-microjet combination." In 14th AIAA/CEAS Aeroacoustics Conference (29th AIAA Aeroacoustics Conference), J. Fluid Mech., vol. 490, pp. 75-98, 2003.

Brausch, J. F. et al., "Supersonic Transport Noise Reduction Technology Summary Phase II. Summary of GE4/SST Acoustic Suppression Research." Report FAA SS, vol. II, pp. 1-473, 1975.

Bridges, James et al., "Parametric testing of chevrons on single flow hot jets." In 10th AIAA/CEAS Aeroacoustics Conference, pp. 1-24, Sep. 2004.

Manson, L. et al., "A study of the use of liquid base foams for jet noise reduction.", National Aeronautics and Space Aministration, pp. 1-146, 1971.

Caeti, Ryan B. et al., "Jet Noise Reduction via Fluidic Injection," AIAA JOurnal, vol. 52, No. 1, pp. 26-32, Jan. 2014.

Camussi, Roberto et al., "Effect of air injection on the far field pressure radiated from a jet at subsonic Mach numbers." International Journal of Aeroacoustics, vol. 7, No. 1, pp. 69-82, 2008.

Casalino, D. et al., "Aircraft noise reduction technologies: a bibliographic review." Aerospace Science and Technology, vol. 12, No. 1, pp. 1-17, 2008.

Castelanin, Thomas et al., "Jet-noise reduction by impinging microjets: an acoustic investigation testing microjet parameters." AIAA journal, vol. 46, No. 5, pp. 1081-1087, 2008.

Castelain, Thomas et al., "Effect of microjets on a high-subsonic jet. Parametric study of far-field noise reduction." In 12th AIAA/CEAS Aeroacoustics Conference (27th AIAA Aeroacoustics Conference), pp. 1-11, May 8-10, 2006.

Curle, N., "The influence of solid boundaries upon aerodynamic sound," Proceedings of the Royal Society of London A: Mathematical, Physical and Engineering Sciences, The Royal Society, vol. 231, pp. 505-514, 1955.

Caeti, Ryan B. et al., "Jet noise reduction via fluidic injection." AIAA Journal, vol. 52, No. 1, pp. 26-32, 2013.

Davis, M. R. "Variable control of jet decay." Aiaa Journal, vol. 20, No. 5, pp. 606-609, 1982.

Gaeta, R. et al., "Large jet-noise reductions through distributed nozzles." In 8th AIAA/CEAS Aeroacoustics Conference & Exhibit, p. 2456, 2002.

Goldstein, M. et al., "Effect of anisotropic turbulence on aerodynamic noise," The Journal of the Acoustical Society of America, vol. 54, No. 3, pp. 630-645, 1973.

Greska, Brenton et al., "High speed jet noise reduction using microjets on a jet engine." In 10th AIAA/CEAS Aeroacoustics Conference, p. 2969, 2004.

Grosch, Chester E. et al., "Numerical simulation of mixing enhancement in a hot supersonic jet." Physics of Fluids, vol. 9, No. 4, pp. 1125-1143, 1997.

Henderson, Brenda "Fifty years of fluidic injection for jet noise reduction." International Journal of Aeroacoustics, vol. 9, Nos. 1-2, pp. 91-122, 2010.

Ibrahim, Mohammed K. et al., "Mixing enhancement of compressible jets by using unsteady microjets as actuators." AIAA Journal, vol. 40, No. 4, pp. 681-688, 2002.

Johnson, A. et al., "Aerodynamic and acoustic optimization for fan flow deflection," 49th AIAA Aerospace Sciences Meeting including the New Horizons Forum and Aerospace Exposition, pp. 1-22, Jan. 4-7, 2011.

Kaltenbach, Martin et al., "Health Consequences of Aircraft Noise," Medicine, vol. 2015, Nos. 31-32, pp. 548-556, 2008.

Kandula, Max et al., "Effective jet properties for the estimation of turbulent mixing noise reduction by water injection." In 13th AIAA/CEAS Aeroacoustics Conference (28th AIAA Aeroacoustics Conference), pp. 1-21, 2007.

Kandula, Max "Prediction of turbulent jet mixing noise reduction by water injection." AIAA Journal, vol. 46, No. 11, pp. 2714-2722, Nov. 2008.

Kandula, Max et al., "Estimation of broadband shock noise reduction in turbulent jets by water injection." In 14th AIAA/CEAS Aeroacoustics Conference (29th AIAA Aeroacoustics Conference), pp. 1-15, 2008.

Krothapalli, A. et al. "Turbulence and noise suppression of a high-speed jet by water injection." Journal of Fluid Mechanics, vol. 491, pp. 131-159, 2003.

Kurganov, A. et al., "Semidiscrete central-upwind schemes for hyperbolic conservation laws and Hamilton-Jacobi equations," SIAM Journal on Scientific Computing, vol. 23, No. 3, pp. 707-740, 2001.

Lardeau, Sylvain et al., "Direct numerical simulation of a jet controlled by fluid injection." Journal of turbulence, vol. 3, No. 2, pp. 1-26, Jan. 2002.

Lau, J. C. et al., "Measurements in subsonic and supersonic free jets using a laser velocimeter," Journal of Fluid Mechanics, vol. 93, part 1, pp. 1-27, 1979.

Lawton, R. N. et al., "Living with aircraft noise: Airport proximity, aviation noise and subjective wellbeing in England," Transportation Research Part D: Transport and Environment, Part D, vol. 42, pp. 104-118, 2016.

Leonard, A., "Energy cascade in large-eddy simulations of turbulent fluid flows," Advances in geophysics, vol. 18, pp. 237-248, 1975.

Lighthill, M. J. et al., "On kinematic waves. II. A theory of traffic flow on long crowded roads," Proceedings of the Royal Society of London A: Mathematical, Physical and Engineering Sciences, vol. 229, The Royal Society, pp. 317-345, 1955.

Lighthill, M. J., "On sound generated aerodynamically. I. General theory," Proceedings of the Royal Society of London A: Mathematical, Physical and Engineering Sciences, vol. 211, The Royal Society, pp. 564-587, 1952.

(56) References Cited

OTHER PUBLICATIONS

Lush, P.a., "Measurements of subsonic jet noise and comparison with theory," Journal of Fluid Mechanics, vol. 46, No. 3, pp. 477-500, 1971.
Mahesh, Krishnan "The Interaction of Jets with Crossflow," Annual Review of Fluid Mechanics, vol. 45, pp. 379-407, 2013.
Manson, Lidia et al., "Jet-Noise Reduction through Liquid-Base Foam Injection." The Journal of the Acoustical Society of America, vol. 50, No. 4A, pp. 1067-1074, 1971.
Martin, M. P. et al., "Subgrid-scale models for compressible large-eddy simulations," Theoretical and Computational Fluid Dynamics, vol. 13, No. 5, pp. 361-376, 2000
Mendez, S. et al., "Post-processing of large-eddy simulations for jet noise predictions," Center for Turbulence Research Annual Research Briefs, pp. 17-31, 2009.
Norum, Thomas "Reductions in multi-component jet noise by water injection." In 10th AIAA/CEAS Aeroacoustics Conference, pp. 1-25, 2004.
Papamoschou, Dimitri et al., "Visual observations of supersonic transverse jets." Experiments in Fluids, vol. 14, No. 6, pp. 468-478, 1993.
Papamoschou, Dimitri "Fan flow deflection in simulated turbofen exhaust," AIAA journal, vol. 44, No. 12, pp. 3088-3097, Dec. 2006.
Papamoschou, Dimitri "New method for jet noise reduction in turbofan engines," AIAA journal, vol. 42, No. 11, pp. 2245-2253, Nov. 2004.
Phillips, O. M. "On the generation of sound by supersonic turbulent shear layers," Journal of Fluid Mechanics, vol. 9, No. 1, pp. 1-28, 1960.
Powell, Alan "The influence of the exit velocity profile on the noise of a jet." The Aeronautical Quarterly, vol. 4, No. 4, pp. 341-360, 1954.
Rajput, P. "Computational Analysis and Optimization of Blockerless Engine Thrust Reverser Concept," 54th AIAA Aerospace Sciences Meeting, vol. 33, No. 1, pp. 213-226, Jan.-Feb. 2017.
Raman, Ganesh "Using controlled unsteady fluid mass addition." AIAA Journal, vol. 35, No. 4, pp. 647-656, Apr. 1997.
Raman, Ganesh et al., "Jet mixing control using excitation from miniature oscillating jets." AIAA Journal, vol. 33, No. 2, pp. 365-368, 1995.
Ribner, H. S., "Quadrupole correlations governing the pattern of jet noise," Journal of Fluid Mechanics, vol. 38, No. 1, pp. 1-24, 1969.
Ribner, H., "The generation of sound by turbulent jets," Advances in applied mechanics, vol. 8, pp. 103-182, 1964.
Seiner, J. et al., "Mixing enhancement by tabs in round supersonic jets," 4th AIAA/CEAS Aeroacoustics Conference, 1998, p. 1-16, 1998.
Tester, B. et al., "Developments in jet noise modellingtheoretical predictions and comparisons with measured data," Journal of Sound and Vibration, vol. 46, No. 1, pp. 79-103, 1976.
Zaman, Khairul "Subsonic jet noise reduction by microjets with various injection port geometry." In 13th AIAA/CEAS Aeroacoustics Conference (28th AIAA Aeroacoustics Conference), vol. 9, No. 6, pp. 705-732, 2010.
Zaman, K., "Jet spreading increase by passive control and associated performance penalty," 30th Fluid Dynamics Conference, 30th AIAA Fluid Dynamics Conference, pp. 1-14, 1999.
Wolfe, P. J. et al., "Costs and benefits of US aviation noise land-use policies," Transportation Research Part D: Transport and Environment, vol. 44, pp. 147-156, 2016.
Williams, J. F. et al., "The Mach wave field radiated by supersonic turbulent shear flows," Journal of Fluid Mechanics, vol. 21, No. Part 4, pp. 641-657, 1965.
Williams, J. F. et al., "The noise from turbulence convected at high speed," Philosophical Transactions of the Royal of London A: Mathematical, Physical and Engineering Sciences, vol. 255, No. 1061, pp. 469-503, 1963.
Viswanathan, Krishna. "Nozzle shaping for reduction of jet noise from single jets." AIAA Journal, vol. 43, No. 5, 1008-1022, 2005.
Viswanathan, Krishna "Elegant concept for reduction of jet noise from turbofan engines." Journal of Aircraft, vol. 43, No. 3, pp. 616-626, 2006.
Goldstein, M.E. "Aeroacoustics," New York, McGraw-Hill International Book Co., vol. 1, pp. 1-318, 1976.

* cited by examiner

Baseline (no injection)

Asymmetric Injection (in the lower half)

(a)

(b)

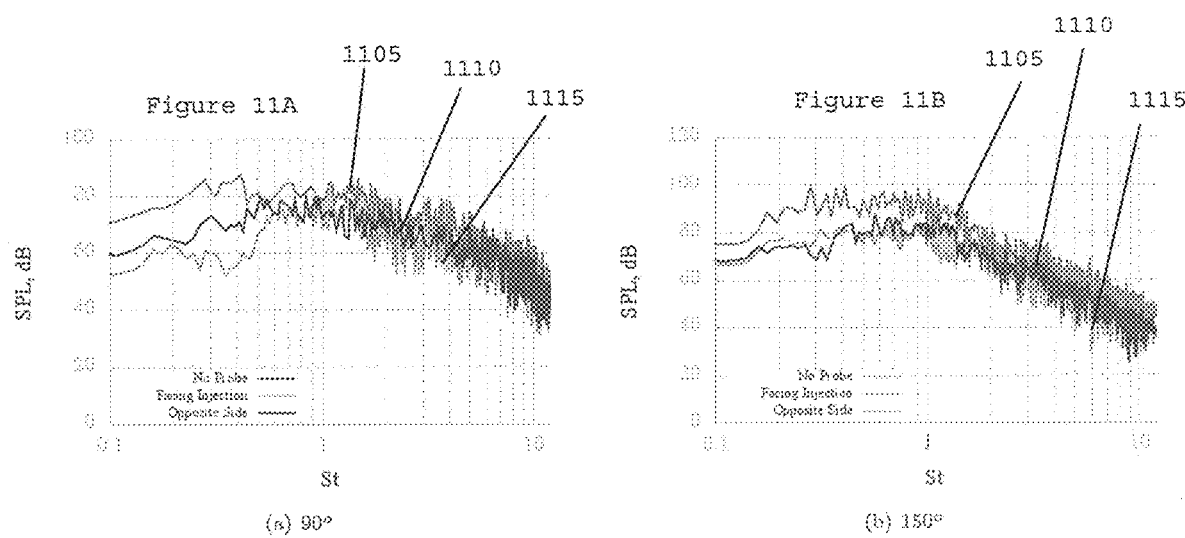

(a) Design based Asymmetry.

(b) Operational Asymmetry.

(a) Design based Asymmetry.

(b) Operational Asymmetry.

(a) Design based Asymmetry.

(b) Operational Asymmetry.

DIRECTIONALLY TARGETED JET NOISE REDUCTION SYSTEM AND METHOD

CROSS-REFERENCE TO RELATED APPLICATION(S)

This application relates to and claims priority from U.S. Patent Application No. 62/635,977, filed on Feb. 27, 2018, and U.S. Patent Application No. 62/671,818, filed on May 15, 2018, the entire disclosures of which are incorporated herein by reference.

FIELD OF THE DISCLOSURE

The present disclosure relates generally to jet noise reduction, and more specifically, to exemplary embodiments of an exemplary directionally targeted jet noise reduction system and method.

BACKGROUND INFORMATION

Noise emanating from jets includes multiple noise sources located within the jet plume. In the case of subsonic jets, the fine scale turbulence close to the nozzle exhaust contributes to high frequency noise, and can dominate the acoustic spectra at observation angles in the upstream direction. The noise arising from large scale structures can radiate in the downstream direction, and predominantly relate to the low frequency spectra.

Over the past few decades, several passive and active flow control procedures have been developed for mitigating the noise generation from high speed jets. Passive control can be accomplished by altering the nozzle shape (e.g. chevrons, tabs, beveling, etc.). Active control relies on the addition of mass or energy to the flow in order to excite flow instabilities, or affect the flow by generating new flow structures (e.g., vortices, shock, etc.). (See, e.g., Reference 11). Active control can be further classified into open-loop and closed-loop control. In an open loop flow control procedure, the actuation of the flow control device takes place based on a predetermined law, and there is no feedback that can be used to modify the control signal. In closed loop control, real time information from sensors in the flow can be used to drive the actuation process. Passive procedures and some open-loop active control techniques (e.g., involving steady mass and/or energy injections, or pulsating injections at frequencies which are much lower than any instability frequency of the flow), can include the enhancement of jet mixing through the generation of stream-wise vorticity.

The presence of small tabs on the nozzle can increase the rate of mixing of the jet and the surrounding fluid. (See, e.g., References 20 and 40). However, the increased mixing, while reducing the low frequency noise, generates excessive high-frequency noise that can overwhelm any acoustic benefit. Moreover, tabbed nozzles result in thrust loss. As an alternative to a tabbed nozzle, serrated nozzle edges, or chevrons, have been used for enhanced mixing and subsequent noise reduction. This is commonly used in jet noise mitigation for medium and high bypass turbofan engines. Chevrons in the nozzle trailing edge induce stream-wise vorticity into the shear layer that leads to increased mixing and reduced length of the jet plume. This mixing enhancement occurs at minimal engine performance of the penalty as the penetration into the flow is lower than that occurring with tabs. Some literature describes a complex dependence of effective noise reduction on various geometrical and design parameters such as the number of chevrons, and the level of penetration into the flow. (See, e.g., Reference 4).

Beveled primary nozzles for both single and dual-stream jets have been described as a way to reduce the jet noise for both subsonic and supersonic operating conditions. (See, e.g., References 43 and 44). The beveled nozzle noise spectrum exhibits strong azimuthal variations of the far-field noise levels with respect to axi-symmetric nozzle, with significant reductions of the noise levels below the longer nozzle lip, suggesting significant energy redistribution. A similar procedure based on the forcing of non-axisymmetric flows has been described. (See, e.g., Reference 33). This procedure includes tilting downwards the secondary flow by a few degrees with respect to the primary flow. This dual stream axial misalignment leads to a lower convective Mach number of the turbulent structures in the shear layer, leading to noise reduction at all frequencies, mainly in the aft radiation arc. The spectral content of the jet noise can also be dramatically altered by splitting the exhaust plume through an array of smaller jet plumes. Each plume generates a higher frequency noise, resulting in a global noise benefit, due to the more effective atmospheric absorption at higher frequencies. (See, e.g., Reference 16).

Microjet injections (e.g., air/water/aqueous) have been described for their effect on jet noise mitigation. (See, e.g., References 21 and 26). Water, in particular, is used to reduce large pressure fluctuations occurring in supersonic jets and blast waves from solid propellant rocket engine of space launchers. Water injection can significantly affect the shock cell structures, with resulting benefits on the shock associated noise (see, e.g., References 17 and 32) and a reduction in Mach wave radiation and shock associated noise. The use of air microjet injection provides noise benefits. Injections at the nozzle exit are also effective. (See, e.g., References 10 and 13).

Exemplary Fluidic Injection for Jet Noise Reduction

Fluid injection reduces the jet velocity and temperature (e.g., in case of heated jets) and facilitates shaping the velocity profile. By injecting fluid, velocity profile modifications can lead to jet noise reduction in the far field. (See, e.g., Reference 36). Many jet noise suppression procedures relying on fluidic injection have been proposed over the last six decades. These procedures used the shape and configuration of the injector, the location of injection, or the fluid being injected to name a few. However, such procedures have had limited effect on jet noise.

Thus, it may be beneficial to provide an exemplary directionally targeted jet noise reduction system, which can overcome at least some of the deficiencies described herein above.

SUMMARY OF EXEMPLARY EMBODIMENTS

An exemplary engine noise reduction system, can be provided, which can include a noise reduction fluid source, and a microjet(s) placed at an axial location downstream from a nozzle exit of an engine and configured to asymmetrically inject a noise reduction fluid from the noise reduction fluid source into a jet flow of the engine. The engine can be a jet engine. The microjet(s) can include four microjets, which can be about 90 degrees apart in a plane at the axial location. The four microjets can be asymmetric microjets. The microjet(s) can be configured to inject the noise reduction fluid in a direction that is normal with respect to the jet flow.

In some exemplary embodiments of the present disclosure, the microjet(s) can have a circular shape. The microjet(s) can be concentric with the engine. The microjet(s) can be configured to inject the noise reduction fluid in a non-parallel direction with respect to the jet flow. The noise reduction fluid can include a high momentum fluid.

A further exemplary jet engine noise reduction system, can be provided, which can include a jet engine(s), and a microjet(s) placed at an axial location downstream from a nozzle exit of the jet engine(s) configured to asymmetrically inject a noise reduction fluid into a jet flow of the jet engine(s). The microjet(s) can include four microjets placed about 90 degrees apart in a plane at the axial location. The microjet(s) can be configured to inject the noise reduction fluid in a direction that is normal with respect to a jet flow of the jet engine. The jet engine(s) can have a serrated edge. The microjet(s) can be configured to inject the noise reduction fluid in a non-parallel direction with respect to the jet flow. The noise reduction fluid can include a high momentum fluid.

An exemplary method for reducing noise from a jet engine can include, providing a microjet(s), and asymmetrically injecting a noise reduction fluid into a jet flow of the jet engine at an axial location downstream from a nozzle exit of the jet engine. The microjet(s) can include, e.g., four or more microjets, which can be about 90 degrees apart in a plane at the axial location. The asymmetrically injecting the noise reduction fluid can include asymmetrically injecting the noise reduction fluid in a direction that can be normal with respect to the jet flow.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 11A is an exemplary graph illustrating sound pressure levels at two microphones placed at 90 degrees according to an exemplary embodiment of the present disclosure;

FIG. 11B is an exemplary graph illustrating sound pressure levels at two microphones placed at 150 degrees according to an exemplary embodiment of the present disclosure;

Figure 1A:
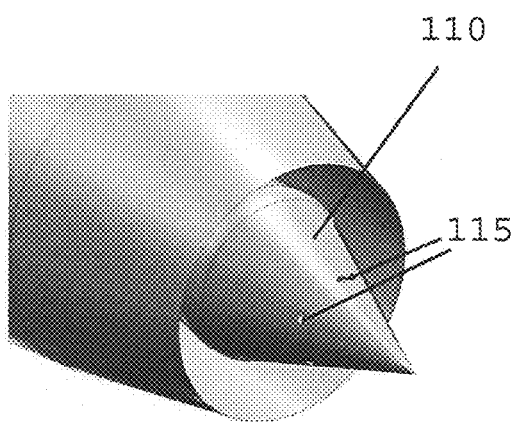
FIGS. 1A-IC are exemplary images of the exemplary asymmetric Downstream Fluidic Injection system according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary Definitions Provided in the Present Disclosure
$\epsilon$ internal energy per unit mass, J/kg
$\epsilon_v$ viscous dissipation
$\mu$ viscosity, kg/(sm)
$\Pi_{dit}$ pressure-dilatation
$\rho$ density, kg/m$^3$
D exit diameter of the nozzle, m
E total energy per unit mass, J/kg
$G_o$ Green's function
h enthalpy per unit mass, J/kg
k thermal conductivity, W/(m·K)
k thermal conductivity
p pressure, N/m$^2$
Q Heat flux, W/m$^2$
$S_{ij}$ Strain rate tensor
SPL Sound pressure level, dB
St Strouhal number
T temperature, K
u velocity, m/s
X axial location of injection, m Aqueous and gaseous based fluid injections involve different flow physics. Aqueous injection represents a multi-phase flow and thus the modifications to the jet plume, and the associated acoustic field, can be linked to the process of droplet evaporation and momentum transfer between droplets and the main jet. The momentum transfer can be beneficial in reducing the effective jet velocity, and thus the radiated noise. Gaseous injections can introduce longitudinal vortices that can evolve with axial distance, and can impact large scale structures and fine scale turbulence. While both types of injections can impact mixing, and shock associated noise, the physical changes in the jet plume that lead to noise reduction can be very different.

Flow field analysis for low mass flow ratios can be used to determine the water droplet behavior as well as turbulence characteristics of the main jet. As the water droplets tend to breakup quickly after injection, the injector type can have negligible impact on the performance. Low mass flow injections can modify the main jet turbulence characteristics, and can reduce the normal component of the R.M.S. velocity by about 30%, and the peak shear stress by about 40%. Reductions in turbulence level and peak shear stress can directly impact the noise generated by fine scale turbulence and large-scale structure in the main jet.

For most types of noise sources, the injection mass flow rate, water pressure, momentum flux ratio and injection angle can have a significant impact on the acoustic field generated by the combined system. Increasing injection mass flow rate or water pressure can decrease noise. (See, e.g., References 19 and 32). Reductions in overall sound pressure levels in the peak noise directions can scale with momentum flux ratio. (See, e.g., Reference 18). Injection angles around 60 degrees can usually lead to maximum noise reduction. (See, e.g., Id.). Microjet injections in hot subsonic jets with a jet Mach number between 0.8 and 0.9 can provide an overall sound pressure level reduction of about 6 dB with MFR=17%. (See, e.g., References 26 and 27). Similarly, in the case of large-scale low-pressure injectors, the maximum noise reduction can be in the order of about 1.5 dB with MFR=84%.

The main jet temperature can play an important role in the noise reduction potential of aqueous injection systems for supersonic nozzles. (See, e.g., Reference 32). However, at subsonic exhaust speeds, water based injection systems can be less effective at reducing mixing noise in the peak jet noise direction for hot jets than for cold jets. This can be attributed to the evaporation of water droplets upon injection into the hot jet resulting in low efficiency of momentum transfer between the microjet and the main jet. Aqueous solutions utilizing long-chain polymers can be used. (See, e.g., Reference 17). However, such systems do not yield significant acoustic improvements over those with water alone. Moreover, such fluid injection systems can utilize a complex delivery system, making their implementation on an aircraft difficult.

Jet noise reduction systems can use various counter-rotating vortex pair ("CVP"), as well as scaling of injected flow penetration depth with injector momentum flux. The CVP resulting from the interaction of an injecting jet and main jet can be bent by the mean flow, and can form a longitudinal vortex pair. When multiple jets are injected into the main flow, the resulting vortex pairs can initially move towards the main jet axis under their own induced velocity until a point can be reached where their mutually induced velocity can become strong enough to cause them to separate, each forming a new pair that can move away from the jet centerline. (See, e.g., Reference 12). For a supersonic main jet, enhanced jet plume mixing can occur for injection systems with two or four injectors but not for eight injectors. (See, e.g., id.).

Differences in injector configuration and operating condition can provide the effect of gaseous injection process on the spectral shape of the main jet. The differences in the mixing characteristics and the acoustic field can be due to injector shape, which can impact the vortex creation and development in the cross-flow. Other factors resulting in such differences can include the number of injectors, injector operating conditions, and/or main jet exhaust speeds used in the experiments.

There is a connection between the flow field associated with that of mechanical chevrons (e.g., serrated nozzle trailing edges) and the resulting acoustic field. CVPs produced by circular injectors can be closer to the high-speed side of the shear layer than those produced by chevrons. (See, e.g., References 1 and 2). The vortices generated by chevrons can rotate in an opposite direction to those of vortices resulting from fluidic injections, and can be such that the vortices can move radially outward shortly after formation. This can result in a significant reduction of vortex strength due to entrainment and dissipation. The vortices generated by air injection can impact the main jet flow for several diameters downstream of the injection point.

Unsteady injections can also be used to excite the natural jet instabilities and can enhance mixing in the process. (See, e.g., References 35, 38 and 39). Pulsed injection may be more effective at jet plume mixing than steady injection. (See, e.g., Reference 29). For high speed jets, enhanced mixing can be achieved with unsteady microjet injection. (See, e.g., Reference 22). Comparable results can be achieved with unsteady injection in engine tests. (See, e.g., References 6 and 28). Mixing enhancement of a jet can depend on the excitation of a jet flapping mode which can be achieved with a number of injection configurations, shapes, and operating conditions.

The impact of fluidic injection on jet noise can depend on the injector configuration, injector operating conditions, the type of noise source targeted, and number of flow streams in the main jet. In subsonic jets, injection angle may significantly impact noise reduction. Increasing the injection angle in general can decrease low frequency noise and can increase high frequency noise. Injection angles between about 45 degrees and about 60 degrees can balance low and high frequency effects, leading to an overall reduction in sound pressure levels. (See, e.g., References 7-9). The low frequency noise reductions can be most prominent in the peak jet noise direction, indicating that the creation or growth of large scale structures within the jet can be altered by the injection process. High frequency noise can increase in the peak jet noise direction, and can be most likely associated with injector self-noise. While increases at small angles to the jet inlet axis can be due to increased turbulence in the main jet just downstream of the injection location. (See, e.g., Reference 7).

An exemplary parameter that can impact noise radiated from subsonic jets can be the Injection Pressure Ratio ("IPR"). An increase in IPR can be accompanied by an increase in injection mass flow rate in most of the injector setups, and thus separating their effects can become difficult. Increasing the injection pressure while decreasing the injection mass flow rate through a reduction of injector size can reduce noise radiated in the peak jet noise direction. (See, e.g., Reference 45).

The number of injectors can also affect the acoustic radiation from a subsonic jet. Varying the number of injectors from about 3 to about 36 can provide a significant sound pressure level reduction. In particular, according to an exemplary embodiment of the present disclosure, a significant sound pressure level reduction can occur for about 18 injectors. (See, e.g., References 10 and 15). The size of the injector port can also be considered as it can help in determining the relative proximity of the injection ports. When a large number of injectors are used (see, e.g., Reference 36), the injected flow from adjacent injectors can begin to interact closer to the injection location, and can lead to destructive interference, subsequently leading to adverse effects on the acoustic field.

The exemplary jet noise reduction system and method can utilize a microjet, which can be placed at an axial location downstream from the nozzle exit, in contrast to other systems which include microjet injections right at the nozzle exit. The high momentum fluid can be injected normal to the jet flow via separate microjets, (e.g., four microjets) that can be about 90 degrees apart, in a plane at a fixed axial location. For example, the separate microjets can range from about 80 degrees apart to about 100 degrees apart. Significant noise reduction can be achieved using a similar setup in the case of subsonic (see, e.g., Reference 37) and supersonic operating conditions. (See, e.g., Reference 14). Based on the amount of fluid injected, and the location along the axis, noise reduction up to about 5.81 dB with respect to the turbulent mixing noise and about 7.99 dB with respect to the broadband shock associated noise may be attained for a supersonic nozzle operating at supersonic conditions. Similarly, in a Mach 0.9 jet, the axial location of the injection can have a significant impact on the noise reduction at the required far field location. (See, e.g., Reference 37).

The exemplary directionally targeted jet noise reduction system and method (e.g., Asymmetric Downstream Fluidic Injection ("ADFI") system and method) can include a fluid injection system that can inject the exemplary asymmetric microjets close to the jet axis via microjet injection ports located downstream from the nozzle exit for primary and/or secondary flow in a high-speed jet engine. The asymmetric microjet injection can lead to an asymmetric, weighted, mixing enhancement which can favor a specific direction for enhanced mixing. This can generate an asymmetric acoustic field with lower noise in the direction of interest. Such an injection can be implemented in a high-speed jet engine for reducing the turbulent mixing noise being radiated towards the ground, while keeping the noise signature unchanged above the aircraft.

Figure 1B:
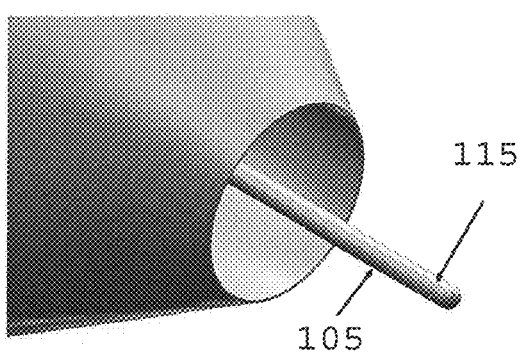
Figure 1C:
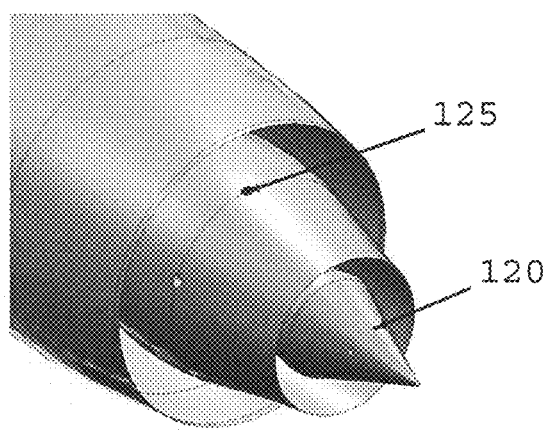

FIGS. 1A-IC show various exemplary embodiments of the exemplary asymmetric fluid injection system and method according to an exemplary embodiment of the present disclosure. The exemplary system and method can be implemented for single or double stream jets, with or without a center body 110. As shown in FIG. 1B, in the absence of center body, an injection tube 105 can be placed close to the axis. There should not be a restriction on the placement of injection tube 105; however, based on symmetry, it can coincide with the axis. The shape of the microjet injection ports 115 shown in FIGS. 1A and 1B can be circular. However, various other shapes such as triangular, rectangular, square, etc. can also be used. Similarly, the distribution of the microjet injection ports 115 can be shown to be concentric with the primary jet in the schematic. However, ports that can be non-concentric with respect to the axis of the jet, but still close to it, can be used. Additionally, primary and secondary injection ports (e.g., primary injection port 120 and secondary injection port 125 as shown in FIG. 1C) can be used. The exemplary injection ports 115, 120, 125 can also be used along with other existing jet noise reduction system such as chevrons, fluid injection at nozzle exhaust, etc.

The exemplary asymmetry inside the jet plume can be induced in various exemplary manners. One form of asymmetry can be induced by using a single injection port located in the direction of interest, or intended direction of maximum noise reduction. Another form of asymmetry can be induced by using two ports with a specified angular separation such that the direction of interest lies within the angular separation. The mixing enhancement induced from the two microjets can lead to constructive interference of induced stream-wise vortices, and can enhance noise reduction in the direction of interest. An exemplary asymmetry can also be induced by using a plurality of injection ports that can be located asymmetrically with respect to the jet axis. Additionally, asymmetry can also be induced in a symmetrical distribution of microjet injection ports by varying the microjet injection flow rate across the injection port. The microjet injection ports closer to, or in the direction of, the targeted noise reduction can be set at higher injection pressure ratios ("IPRs") compared to the ports in the opposite direction. Further, asymmetry can also be induced by a combination of the above-mentioned asymmetries.

The mixing enhancement induced in the jet plume can be weighted to have higher mixing in the direction of interest leading to higher noise reduction. Thus, the jet plume can be shaped from the inside out, and the surrounding acoustic field can be tailored, without affecting the overall shape of the jet plume and consequently, having a minimal impact on the thrust and its associated direction.

Figure 2:
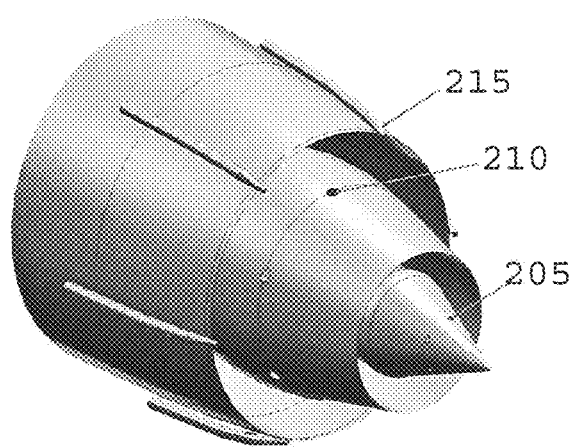
FIG. 2 is an exemplary image of the exemplary asymmetric Downstream Fluidic Injection system having external fluid injectors according to an exemplary embodiment of the present disclosure.
Figure 3:
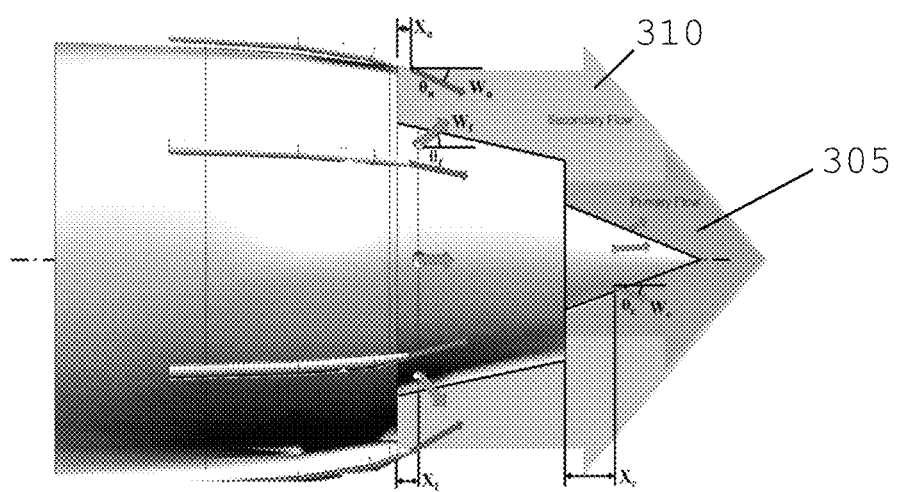
FIG. 3 is an exemplary image of the exemplary asymmetric Downstream Fluidic Injection system having a parametric design according to an exemplary embodiment of the present disclosure.
Figure 4:
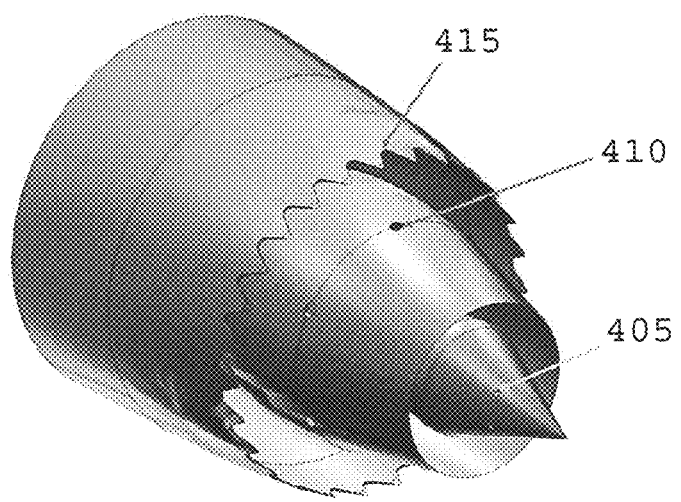
FIG. 4 is an exemplary image of the exemplary asymmetric Downstream Fluidic Injection system having a serrated edge according to an exemplary embodiment of the present disclosure.
Figures 5A, 5B, 5C, 5D:
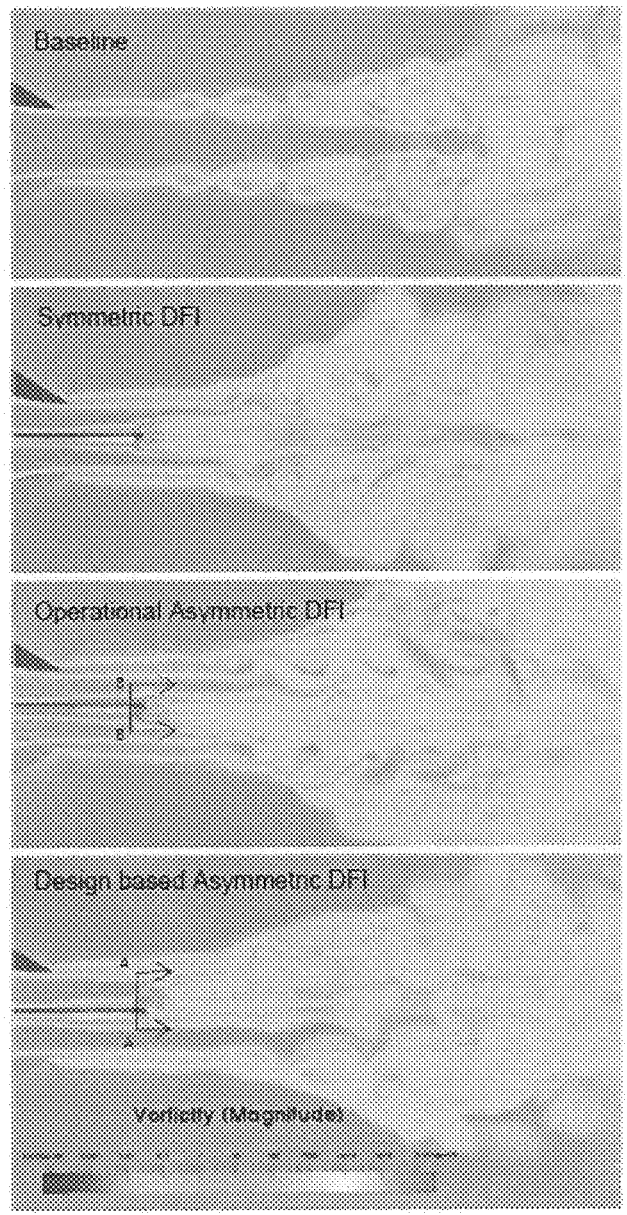
FIG. 5A is an exemplary vorticity contour plot generated without the use of an injector tube.
FIG. 5B is an exemplary vorticity contour plot for a symmetric Downstream Fluidic Injection system according to an exemplary embodiment of the present disclosure.
FIG. 5C is an exemplary vorticity contour plot for an asymmetric Downstream Fluidic Injection system according to an exemplary embodiment of the present disclosure.
FIG. 5D is an exemplary vorticity contour plot for a design-based asymmetric Downstream Fluidic Injection system according to an exemplary embodiment of the present disclosure.
Figures 5E, 5F:
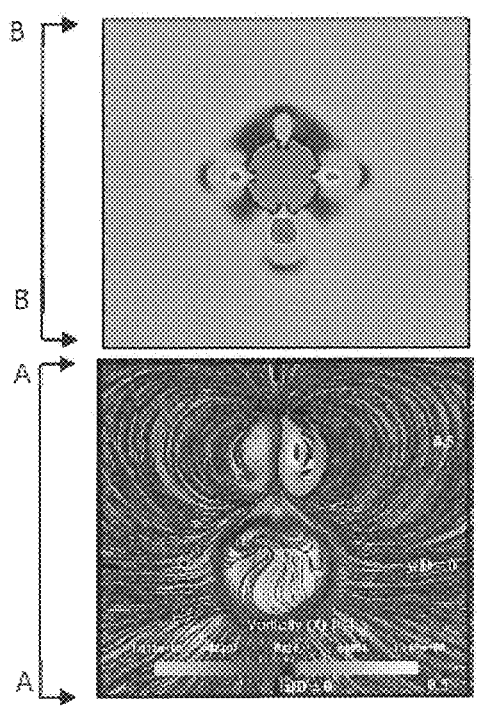
FIG. 5E is a an exemplary vorticity contour plot of section B-B from FIG. 5C according to an exemplary embodiment of the present disclosure.
FIG. 5F is a an exemplary vorticity contour plot of section A-A from FIG. 5D according to an exemplary embodiment of the present disclosure.

FIGS. 2-4 show various exemplary embodiments of the exemplary system according to the present disclosure in conjunction with other noise reduction technologies such as external/nozzle trailing edge injectors, nozzle trailing edge serrations, or chevrons. Any such setup can be parametric in nature, and the parametric optimization process can be determined for each such configuration. For example, FIG. 2 shows an exemplary diagram of an exemplary system, in which the exemplary microjet injection ports (e.g., primary injection port 205 and secondary injection port 210) are combined with one or more external injectors 215.

FIG. 3 shows a side view of an exemplary parametric setup/configuration with external injectors. For example, as shown in FIG. 3, a primary flow can be generated using primary injection ports 205 which are illustrated in FIG. 2. Additionally, a secondary flow can be generated using secondary injection ports 210 and/or external injectors 215 shown in FIG. 2. FIG. 4 shows an exemplary diagram of another exemplary embodiment of the exemplary system that incorporates primary injection port 405, secondary injection port 410, and a serrated edge (chevron) nozzle 415.

Prior asymmetric noise reduction systems have a significant thrust penalty associated with it. Moreover, the asymmetry induced in the flow field can also affect the primary direction of thrust to a certain extent. When implemented in an aircraft, this can mean additional loading of the control surfaces in order to correct the flight path and maintain stability.

The exemplary jet noise reduction system and method can provide significant improvement over other asymmetric noise reduction methods due to the following. It can offer the ability to shape the jet plume and tailor the acoustic filed around it as per user's need. While previous systems can affect the shear layer symmetry, and can thus affect the directionality of the jet, the exemplary system and method does not affect shear layer directly, but can enhance mixing from the inside out, thus having a minimal impact on the directionality or thrust direction.

The exemplary system according to various exemplary embodiments of the present disclosure can provide operational flexibility absent in permanent design based asymmetric solutions which cannot be turned off when not needed, and can reduce the associated thrust penalty. Considerably less thrust loss can be seen as compared to a full 360-degree noise suppressor. Considerably less fluid injection requirements can also be seen as compared to a full 360-degree fluid injection based noise suppression procedure. Less load on the compressor or any device that would supply the high-pressure fluid needed for fluid injection can also be seen.

Microjet injection at an angle to a uniform flow (e.g., also referred to as Jet in Crossflows) can lead to the formation of multiple complex flow structures such as ring vortices, counter rotating vortex pairs ("CVP"), horse shoe vortices, wake vortices etc. in the vicinity of the microjet injection location. CVP can be an important flow structure in such flow setup due to its contribution towards bulk fluid motion, leading to mixing enhancement. The shear layer upstream of the edge of the microjet can develop oscillations, leading to roll up of jet fluid into large packets. This can travel along the upper edge of the jet, contributing to a high degree of intermittency. As the trajectory of the jet can bend to follow the cross-flow direction, a CVP can be formed which can lead to further entrainment of the cross-flow fluid. This can have a significant impact on the structure and mixing of the cross-flow. The jet in cross-flow can entrain and mix fluid in the same manner as a jet in a stationary fluid, for example, via structures in the jet shear layer. However, it can also entrain cross-flow fluid through the action of CVP.

Prior fluid injection procedures inject microjets of fluid close to the shear layer. In the case of an asymmetric setup, this can lead to significant deflection of the primary flow due to the low pressure created between the microjets and the primary flow. The exemplary system and method can inject fluid close to the jet axis where the flow can be uniform. Thus, the enhanced mixing can interact with the shear layer to break down large scale structures known to be the source of low frequency noise. Close to the axis, the flow can be more uniform, thus providing sufficient time for the CVP to grow and entrain the primary and or secondary flow. This bulk fluid motion can enhance mixing and can reduce the turbulent mixing noise in the far field. FIGS. 5A-5F illustrate the vorticity contours on a sectional view of the fluid flow domain for baseline and fluid injection cases. It can be seen from these figures that Asymmetric DFI, both design and operational can lead to enhanced mixing in a particular direction. The sectional views corresponding to the flow setup depict the Mach contours and vorticity in a perpendicular plane in the vicinity of the injection ports.

Figure 6A:
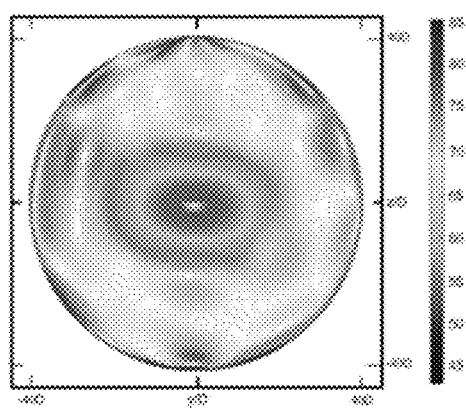
FIG. 6A is an exemplary graph of the sound pressure level on a hemispherical surface for a baseline non injection system.
Figure 6B:
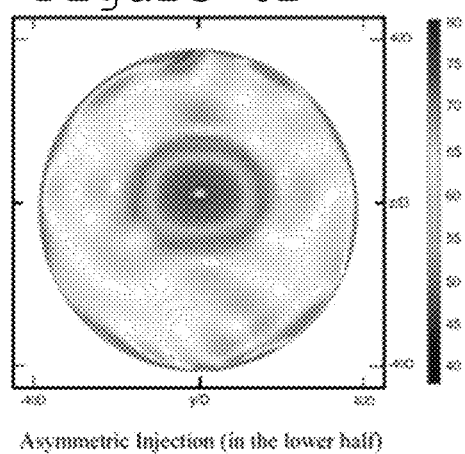
FIG. 6B is an exemplary graph of the sound pressure level of an asymmetric Downstream Fluidic Injection system according to an exemplary embodiment of the present disclosure.

FIG. 6A shows an exemplary graph of the sound pressure level on a hemispherical surface for a baseline non injection system. FIG. 6B shows an exemplary graph of the sound pressure level of an Asymmetric Downstream Fluidic Injection system according to an exemplary embodiment of the present disclosure.

Figures 7A, 7B:
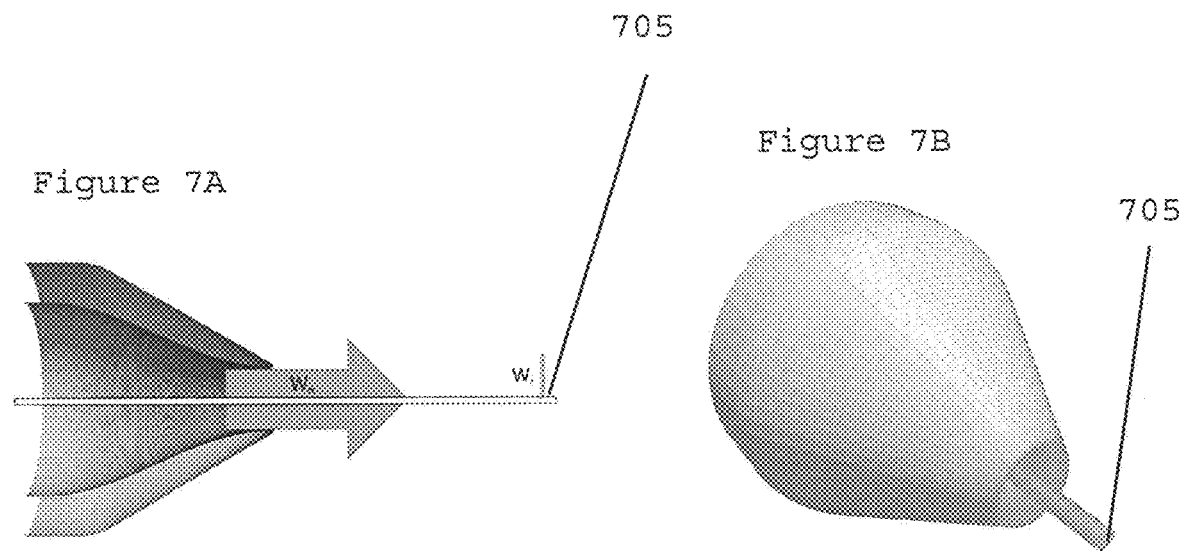
FIG. 7A is an exemplary diagram of a side cross-sectional view of the exemplary nozzle-injector according to an exemplary embodiment of the present disclosure.
FIG. 7B is an exemplary diagram of a perspective view of an actual nozzle including the exemplary downstream, etc. injection system according to an exemplary embodiment of the present disclosure.

As shown in the exemplary diagram of FIGS. 7A and 7B, the exemplary microjet fluid injection system according to an exemplary embodiment of the present disclosure based on downstream fluid injection can utilize microjets 705 placed at an axial location downstream from the nozzle exit. Depending on the amount of fluid injected and the location along the axis, noise reduction up to 5.81 dB with respect to the turbulent mixing noise, and 7.99 dB with respect to the broadband shock associated noise was observed. A symmetric downstream fluidic injection was previously implemented for a Mach 0.9 nozzle and significant mixing enhancement was observed in the jet plume, leading to far field noise reduction. (See, e.g., References 62 and 63). This can provide an economically viable solution for targeted noise reduction of a jet in a particular direction of interest. For an aircraft, only the noise being radiated towards the ground matters. This implies that the noise suppression requirement in itself can be asymmetric in nature.

Figure 14A:
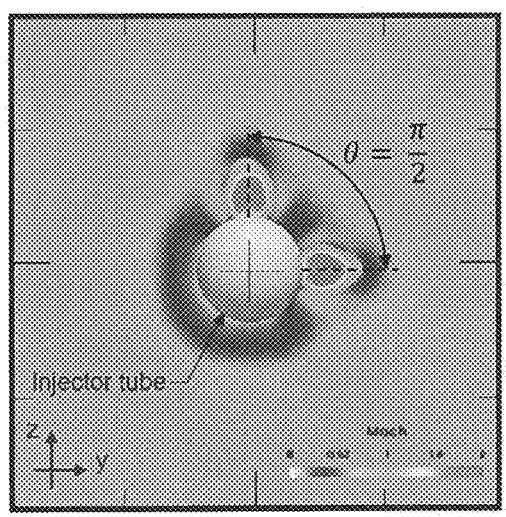
FIG. 14A is an exemplary contour plot/illustration in the perpendicular plane at the injection location for design-based asymmetry according to an exemplary embodiment of the present disclosure.
Figure 14B:
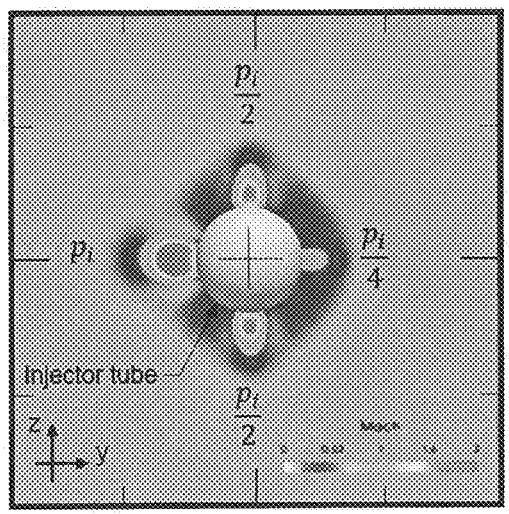
FIG. 14B is an exemplary contour plot/illustration in the perpendicular plane at the injection location for operational asymmetry according to an exemplary embodiment of the present disclosure.

The jet flow can be simulated by passing unheated air through an axisymmetric convergent nozzle to produce a nozzle exhaust of Mach 0.9. An acoustic Reference nozzle ("ARN2") was used, which can include a set of reference nozzles with an exit diameter of 2.0 inches (e.g., 50.8 mm). (See, e.g., Reference 64). As shown in the diagram of FIG. 7A, Wn can represent the nozzle flow, and Wi can be the microjet injection normal to the nozzle flow at an axial location downstream of the flow. The flow conditions are provided in Table 1 below. For example, there can be two fundamental types of asymmetry associated with the exemplary injection system: Design-based asymmetry and Operational asymmetry. (See e.g., contour plots shown in FIGS. 14A and 14B). Design-based asymmetry relates to asymmetrically distributed injection ports, whereas, operational asymmetry involves symmetrically distributed injection ports with asymmetric injection flow rates.

TABLE 1

Inflow conditions. (See, e.g., Reference 64).

|  | Mach | Pressure (psia) | Temperature (deg R) | Angle of Attack (deg) | Angle of Sideslip |
|---|---|---|---|---|---|
| Jet Inflow | N/A | 26.612 | 529.64 | 0.0 | 0.0 |
| Free Stream | 0.01 | 14.3 | 529.64 | 0.0 | 0.0 |

Exemplary Computational Grid

Figure 8A:
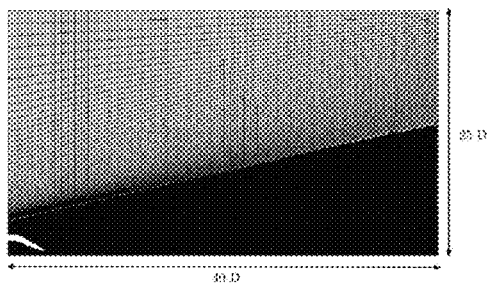
FIG. 8A is an exemplary diagram of a computational domain grid according to an exemplary embodiment of the present disclosure.
Figure 8B:
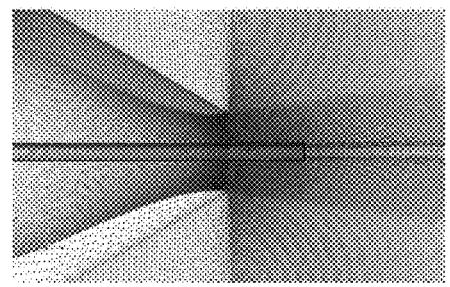
FIG. 8B is an exemplary diagram a computation grid illustrating details at nozzle exit according to an exemplary embodiment of the present disclosure.

FIG. 8A shows an exemplary diagram/illustration of a computational domain grid according to an exemplary embodiment of the present disclosure and FIG. 8B shows an exemplary diagram a computation grid illustrating details at nozzle exit according to an exemplary embodiment of the present disclosure. The domain extends up to 40D in the axial direction and 25D normal to the nozzle axis. A hybrid block structured-unstructured grid with both structured and unstructured blocks can be used. The finely meshed jet core region and nozzle exit can be meshed using structured blocks (see e.g. grid illustrated in FIG. 8B) facilitating tighter control over element quality and grid stretching as one moves far from the nozzle lip. Various grid resolutions can be tested and grid convergence can be established using aerodynamic and acoustic results. (See, e.g., Reference 60).

Exemplary Flow Field Modeling

The jet flow can be simulated using Large Eddy Simulation ("LES") in a modified OpenFOAM solver. LES can intermediate between the direct numerical simulation ("DNS") of turbulent flows and the solution of Reynold's Averaged Navier Stokes ("RANS") simulation. In LES, the computational cost of DNS can be reduced by modeling the smallest scales, which can be the most computationally expensive to resolve, via the implementation of a low-pass filtering of the Navier-Stokes equations. (See, e.g., Reference 65). Thus, for example $$\overline{\phi(x,t)} = \int_{-\infty}^{\infty}\int_{-\infty}^{\infty}\phi(r,t')G(x-r,t-t';\hat{\Lambda},T_c)dt'dr \quad (1)$$

For example, G can be the filter convolution kernel, i can be the cutoff length scale and $T_c$ can be the cutoff time scale. Thus, this low-pass filtering can remove small-scale information from the numerical solution. However, the effect of the smallest scales of turbulence can be modeled.

Applying the Favre-filtering operation, (see, e.g., References 66 and 67), the following resolved governing equations were determined as, for example:

$$\frac{\partial \overline{\rho}}{\partial t} + \frac{\partial}{\partial x_j}(\overline{\rho}\tilde{u}_j) = 0 \quad (2)$$

$$\frac{\partial \overline{\rho}\tilde{u}_i}{\partial t} + \frac{\partial}{\partial x_j}(\overline{\rho}\tilde{u}_i\tilde{u}_j + \overline{p}\delta_{ij} - \tilde{\sigma}_{ji}) = -\frac{\partial T_{ji}}{\partial x_j} \quad (3)$$

$$\frac{\partial (\overline{\rho}\tilde{\epsilon})}{\partial t} + \frac{\partial}{\partial x_j}(\overline{\rho}\tilde{u}_j\tilde{\epsilon}) + \frac{\partial \tilde{q}_j}{\partial x_j} + \overline{p}\tilde{S}_{kk} - \tilde{\sigma}_{ji}\tilde{S}_{ij} = -C_v\frac{\partial Q_j}{\partial x_j} - \Pi_{dil} + \epsilon_v \quad (4)$$

$$\frac{\partial (\overline{\rho}\tilde{h})}{\partial t} + \frac{\partial}{\partial x_j}(\overline{\rho}\tilde{u}_j\tilde{h}) + \frac{\partial \tilde{q}_j}{\partial x_j} - \frac{\partial \overline{p}}{\partial t} - \tilde{u}_j\frac{\partial \overline{p}}{\partial x_j} - \tilde{\sigma}_{ji}\tilde{S}_{ij} = \quad (5)$$

$$-C_v\frac{\partial Q_j}{\partial x_j} - \Pi_{dil} + \epsilon_v$$

-continued $$\frac{\partial (\overline{\rho}\tilde{E})}{\partial t} + \frac{\partial}{\partial x_j}[(\overline{\rho}\tilde{E} + \overline{p})\tilde{u}_j + \tilde{q}_j - \tilde{\sigma}_{ij}\tilde{u}_i] = -\frac{\partial}{\partial x_j}(\gamma C_v Q_j + \frac{1}{2}\varsigma_j - D_j) \quad (6)$$

For example, ρ can be the density, $u_j$ can be the velocity in the $x_j$ direction, p can be the pressure, $\epsilon = c_v T$ can be the internal energy per unit mass, T can be the temperature, $h = \epsilon + p/\rho$ can be the enthalpy per unit mass, $E = \epsilon + u_i u_i/2$ can be the total energy per unit mass, and the diffusive fluxes can be given by $$\tilde{\sigma}_{ij} = 2\tilde{\mu}\tilde{S}_{ij} - \frac{2}{3}\tilde{\mu}\delta_{ij}\tilde{S}_{kk}, \quad (7)$$

$$\tilde{q}_j = -\tilde{k}\frac{\partial \tilde{T}}{\partial x_j}$$

where $$S_{ij} = \frac{1}{2}\left(\frac{\partial u_i}{\partial u_j} + \frac{\partial u_j}{\partial u_i}\right)$$

can be the strain rate tensor, and $\tilde{\mu}$ and $\tilde{k}$ can be the viscosity and the thermal conductivity corresponding. In addition to the mass and momentum equations, and one or more equations for the internal energy, enthalpy, or total energy can be solved.

The effect of the Sub-Grid Scale ("SGS") appears on the governing equation in the form of SGS stresses $T_{ij}$, heat flux Q, pressure-dilation $\Pi_{dil}$, viscous dissipation $\epsilon_v$, turbulent diffusion $\partial D_j/\partial x_j$ and viscous diffusion $\partial Dj/\partial xj$. These SGS quantities can be calculated as, for example: (See, e.g., Reference 67).

$$T_{ij} = \overline{\rho}(\widetilde{u_i u_j} - \tilde{u}_i\tilde{u}_j) \quad (8)$$

$$Q_j = \overline{\rho}(\widetilde{u_j T} - \tilde{u}_j\tilde{T}) \quad (9)$$

$$\Pi_{dil} = \overline{pS_{kk}} - \overline{p}\tilde{S}_{kk} \quad (10)$$

$$\epsilon_v = \overline{\sigma_{ij}S_{ij}} - \tilde{\sigma}_{ij}\tilde{S}_{ij} \quad (11)$$

$$\varsigma_j = \overline{\rho}(u_j\widetilde{u_k u_k} - \tilde{u}_j\widetilde{u_k u_k}) \quad (12)$$

$$D_j = \overline{\sigma_{ij}u_i} - \tilde{\sigma}_{ij}\tilde{u}_i \quad (13)$$

Pressure gradient and pressure diffusion correlations have been expressed herein in terms of $Q_j$ and $\Pi_{dil}$ using the equation of state. The anisotropic part of the SGS stresses can be parameterized using the Smagorinsky model (see, e.g., Reference 68), while the SGS energy $\tau_{kk}$ can be modeled separately. Thus, for example:

$$T_{ij} - \frac{\delta_{ij}}{3}T_{kk} = -C_s^2 2\bar{\Delta}^2\overline{\rho}|\tilde{S}|\left(\tilde{S}_{ij} - \frac{\delta_{ij}}{3}\tilde{S}_{kk}\right) = C_s^2\alpha_{ij} \quad (14)$$

$$T_{kk} = C_I 2\bar{\rho}\bar{\Delta}^2|\tilde{S}|^2 = C_I\alpha \quad (15)$$

where $C_s = 0.16$, $C_1 = 0.09$ and $$|\tilde{S}| = (2\tilde{S}_{ij}\tilde{S}_{ij})^{\frac{1}{2}}$$

One of the challenges in modeling compressible flows for high speed jet noise problems can be in the simultaneous treatment of high gradients, flow discontinuities (e.g., shocks) and fine scale turbulence structures. An exemplary goal can be to successfully and efficiently capture the discontinuities while simultaneously using accurate centered procedures for turbulent flows. This can indicate the need for low dissipation procedures that can efficiently resolve the small scale turbulent structures in the flow field simultaneously. A diffusive procedure can be utilized for a flow field with sharp gradients and discontinuities, in order to help maintain the stability of the simulation.

Within the OpenFOAM® library, the central upwind procedure (see, e.g., Reference 69) has been implemented in the solver rhoCentralFoam and has been thoroughly verified and validated. Even though this solver can capture the flow discontinuities existing in the domain, the associated dissipation can be too strong to resolve fine-scale turbulent structures with a reasonable grid resolution. Thus, there can be a need for a hybrid approach based on localized second-order spatial filtering of the conservative flow variables which can effectively treat both of these fluid flow phenomena. Prior systems incorporated a combination of the dissipative Kurganov-Tadmor procedure and a non-dissipative central procedure. The exemplary noise reduction system can also utilize a shock sensor to identify cells with high gradients and to partition the flow field into two regions. In the first region, containing the cells with high gradients, dissipative procedure can be used to capture flow discontinuities, for example, near shock waves. In the second region, a central procedure can be used to resolve the turbulence structures in the relatively homogeneous part of the flow. This can be implemented as a linear combination of central and conventional dissipative flux as shown in Eq. 16

$$\psi_{hybrid} = \xi \psi_{dissipative} + (1-\xi)\psi_{central} \tag{16}$$

where $\psi_{dissipative}$ can be the interface flux based on the Kurganov-Noelle-Petrova procedure where premitive variables can be derived from MUSCL reconstruction method along with low dissipation vanLeer limiter. $\psi_{central}$ can be the flux constructed from central procedure in skew-symmetric form.

Exemplary Jet Noise Computation

The mixing noise from high-speed jets can include the following exemplary components: (i) large scale vortical fluctuations in the jet plume (e.g., predominant in the forward quadrant close to the jet axis), and (ii) small scale turbulent fluctuations. Due to the more universal character of the latter, it can be predicted based on statistical turbulence models and acoustic analogy formulations. Most of the early analytical work on jet noise modeling was focused on Lighthill's acoustic analogy. (See, e.g., Reference 70 and 71). Further analytical improvements included extension of the theory to model moving jets, (see, e.g., Reference 72), turbulence correlation tensors (see, e.g., Reference 73 and 74), and subsequent removal of the Doppler singularity, effects of convection due to mean flow (see, e.g., Reference 75 and 76), and the description of the Mach wave radiation occurring when vortical disturbances can be convected at supersonic phase speeds. (See, e.g., Reference 77).

It has been observed that the predictions using Lighthill's acoustic analogy were not uniformly valid and indicated the need for alternate models for noise generation and propagation within the jet plume. (See, e.g., Reference 78). Additionally, it has been argued that the discrepancies between the experimental measurements and predictions using Lighthill's analogy at low observation angles away from the jet axis were due to the mean flow refraction effects. (See, e.g., Reference 79). Thus, were rearranged the governing equations (e.g., mass and momentum) in the form of a convected wave equation with a specified source term. However, some sound propagation terms ended up being in the source term. In order to fix this, a $3^{rd}$ order convective wave equation for transversely sheared mean flows was derived in which all the linear propagation terms were removed from the source term. (See, e.g., Reference 81). Lilley's wave equation was solved for a sheared jet and determined semi-empirical solutions of the radiated acoustic field. (See, e.g., Reference 82).

The integral formulation of Lighthill's analogy can be generalized for flows in the presence of solid walls. The free space Greens's function $G_0$ and aeroacoustical variable was used for the density $\rho'$. (See, e.g., Reference 83). Consider the expanded for of Lighthill's analogy:

$$\frac{\partial^2 p}{\partial t^2} = \frac{\partial^2}{\partial x_i \partial x_j}(P_{ij} + \rho u_i u_j) - \frac{\partial f_i}{\partial x_i} \tag{17}$$

Subtracting the term $c_{2o}(\partial 2\rho'/\partial x2i)$ from both sides of the equation, the following formulation, for example, can be obtained as, for example:

$$\frac{\partial^2 p'}{\partial t^2} = C_o^2 \frac{\partial^2 p'}{\partial x_i^2} = \frac{\partial^2 T_{ij}}{\partial x_i \partial x_j} - \frac{\partial f_i}{\partial x_i} \tag{18}$$

where $T_{ij}$ can be the Lighthill stress tensor. SPL can be calculated at a far-field location from flow data on an arbitrarily-shaped surface S. If the surface S does not correspond to a physical solid surface, the FW-H formulation can be referred to as permeable formulation. An advantage of this formulation can be that it facilitates the acoustic sources to be outside the solid surfaces (e.g., walls) and inside the data surface ("S") to be taken into account. The time history of conservative variables can be saved over a given surface S (e.g., FWH surface) at a specified sampling frequency f and for a total time τ. f can be associated with the Nyquist Strouhal number and r can provide the minimum frequency accessible by this post-processing. (See, e.g., Reference 38). For each surface element of S, the time history of source terms $F_1$ and $F_2$ can be constructed from the saved data using the following exemplary expressions:

$$F_1 = \frac{p'\hat{n}_j\hat{r}_j + \rho u_j u_n \hat{r}_j}{a_o r} + \frac{\rho u_n}{r} \tag{19}$$

$$F_2 = \frac{p'\hat{n}_j\hat{r}_j + \rho u_j u_n \hat{r}_j}{r^2} \tag{20}$$

where $\hat{n}_j$ can be the jth component of the unit surface normal vector and $\hat{r}_j$ can represent magnitude and direction of the vector from the surface element location y to the observer location x. p' can be the fluctuating pressure $p-p_\infty$ and $u_j$ can be the $j_{th}$ component of the velocity vector. $F_1$ and $F_2$ can be windowed using a Hanning window after subtracting the mean. The source integrals can then be calculated in the frequency domain and the retarded time ($e^{(-iwr/a_o)}$) can be applied. The Fourier transform of the pressure at the observer location can then be evaluated by integrating the source terms over the surface. Thus, for example:

$$4\pi \hat{p}(x, w) = \int_s iw\hat{F}_1(y, w)e^{\left(\frac{-iwr}{a_o}\right)}dy + \int_s \hat{F}_2(y, w)e^{\left(\frac{-iwr}{a_o}\right)}dy \quad (21)$$

The narrow band sound pressure level ("SPL") in dB can be computed using Eq. 22

$$SPL(x, St) = 10\log_{10}\left(\frac{2\hat{p}(x, w)\hat{p}^*(x, w)}{St_{min}P_{ref}^2}\right) \quad (22)$$

$\hat{p}^*$ can be the complex conjugate of $\hat{p}$. $p_{ref}$ can be chosen to be $2\times 10^{-5}$ Pa. In case of axisymmetric problems, such as jet flows, azimuthal averaging can be used to obtain better statistical convergence. For each azimuthal location, power spectral densities can be calculated at 32 azimuthal locations and averaged. The overall sound pressure level ("OASPL") can be calculated using Eq. 23. (See, e.g., Reference 84).

$$OASPL(x) = 10\log_{10}\left(\sum_{St_{min}}^{St_{max}}\frac{2\hat{p}(x, w)\hat{p}^*(x, w)}{P_{ref}^2}\right) \quad (23)$$

Exemplary Results

Figure 9:
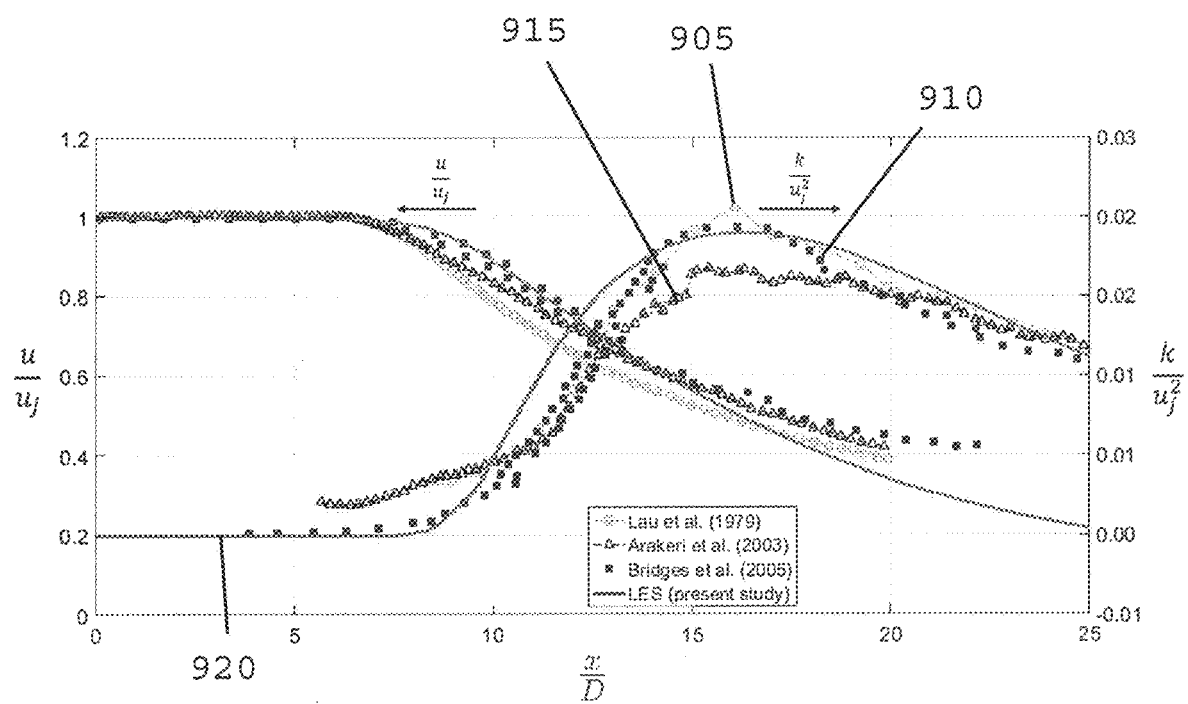
FIG. 9 is an exemplary graph illustrating a comparison of the centerline values of the exemplary noise reduction downstream, etc. system compared to prior systems according to an exemplary embodiment of the present disclosure.

The computational model was first validated with the experimental setup (see, e.g., Reference 64), and previously published experimental data for nozzles operating under similar conditions. (See, e.g., References 85 and 86). FIG. 9 shows an exemplary graph illustrating a comparison of the centerline values of the exemplary noise reduction system compared to prior systems according to an exemplary embodiment of the present disclosure. In particular, in the graph illustrated in FIG. 9, there is a comparison of the centerline values of velocity (u/u$_j$) and turbulent kinetic energy $$\left(k\bigg/\left(u\frac{2}{j}\right)\right)$$

of the exemplary noise reduction system (e.g., plot 920) with previous studies (e.g., studies/plots 905, 910, and 915). As can be seen from the graphs in FIG. 9, the computational results can be within reasonable agreement with the published experimental data.

Exemplary Single Microjet

Figure 10A:
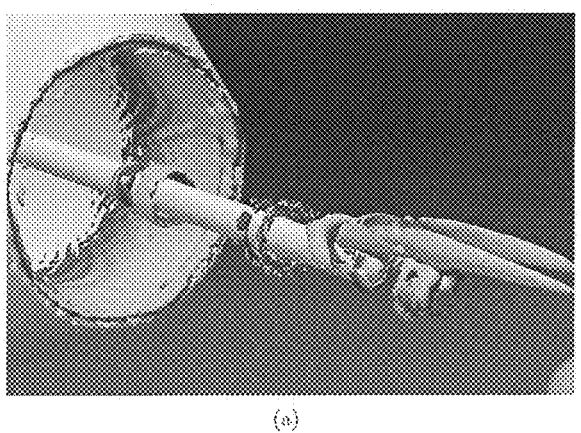
FIG. 10A is an exemplary image of Q-criterion iso surface at microjet injection according to an exemplary embodiment of the present disclosure.

The downstream fluidic injection procedure can be a type of jet in cross-flow problem. (See, e.g., Reference 87). Jets in cross-flow have been the primary focus of many research studies owing to their widespread industrial applications. In such a jet in cross-low setup, the jet fluid can emanate from an orifice at an angle (e.g., approximately 900) into a cross-flowing stream. The shear layer upstream of the edge of the jet can develop oscillations leading to rolling up of jet fluid into large packets, which can travel along the upper edge of the jet. This can contribute to a high degree of intermittency there. As shown in the diagram of FIG. 10A, as the trajectory of the jet bends to follow the cross-flow direction, a counter-rotating vortex pair can be formed and leads to further entrainment of the cross-flow fluid. As shown in the vorticity plot illustrated in FIG. 10B, this can have a significant impact on the structure and mixing of the jet. The jet in cross-flow can entrain fluid in the same manner as a jet in a quiescent fluid, for example, via structures in the jet shear layer. However, it can also entrain cross-flow fluid through the action of CVP. The formation and efficacy of CVP can depend on effective jet penetration into the cross-flow, which can be measured using the resultant jet trajectories. Previous research studies have shown that momentum flux ratio ($J_j/J_f$) can determine the resultant jet trajectory. (See, e.g., References 87-89). Preliminary simulations indicate similar behavior, (see, e.g., Reference 62), as low microjet injection pressures can lead to low, or no, jet penetration. However, as the injection pressure can be increased, substantial jet penetration can be observed. Thus, the injection pressure ratio can be used to control the resultant microjet trajectory and, indirectly, the offset between the CVP axis and the jet axis. (See, e.g., Reference 63).

Figure 10B:
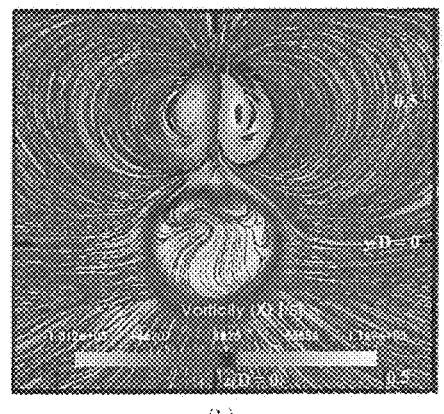
FIG. 10B is an exemplary vorticity plot at microjet injection location for a single microjet according to an exemplary embodiment of the present disclosure.

Vorticity generation due to the microjet injection, and subsequent formation of CVP, can be clearly seen in the stream-wise vorticity plot shown in FIG. 10B. The exemplary microjet injection can cause an asymmetry in the jet flow due to enhanced mixing on the injection side of the flow. (See, e.g., FIGS. 5B and 5D). The induced vortices on the microjet side can lead to reduced sound pressure levels in the far field microphones in the same quadrant. This can be seen in the SPL plots shown in FIGS. 11A and 11B, which show exemplary graphs illustrating sound pressure levels with no probe 1105, and at two microphones placed at 900 and 150°, respectively, such that one can be facing the fluidic injection (e.g., plot 1110) and the other lies on the opposite side (e.g., plot 1115). It can be seen that, for the microphone facing the microjet, a lower SPL can be measured. Thus, the generated asymmetry in the flow field can induce asymmetry in the acoustic field, and can be tailored to target noise reduction in a specific direction.

Figure 12:
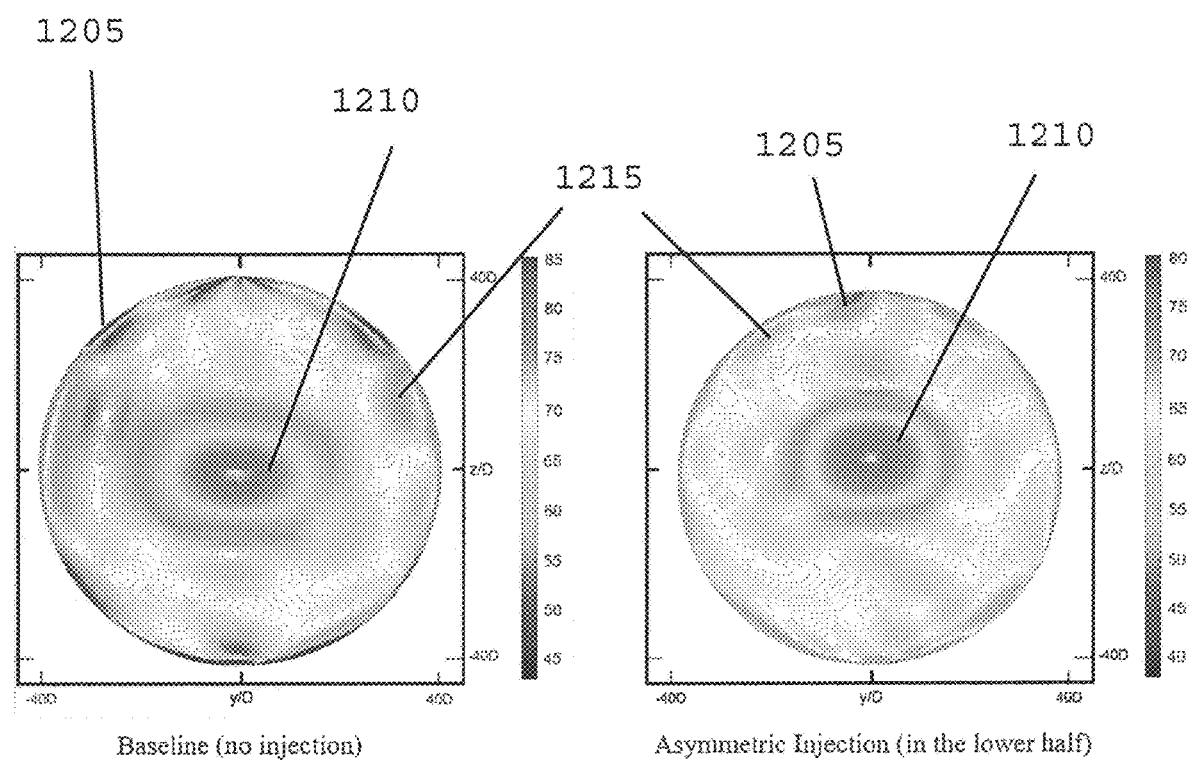
FIG. 12 is a set of sound pressure level diagrams/illustrations along a hemisphere from nozzle exhaust according to an exemplary embodiment of the present disclosure downstream, etc.

In order to analyze the asymmetric acoustic field arising from such a flow field, a new approach utilizing a spherical distribution of microphones was developed. This uniform hemispherical distribution of microphones measures sound pressure level at various points along the surface of a hypothetical sphere of radius 40D. This can facilitate a visualization of asymmetric sound fields generated in this case. The directional (e.g., azimuth) domain of influence of individual microjets, and when working in tandem, can be evaluated. FIG. 12 shows a set of sound pressure level diagrams along a hemisphere from nozzle exhaust. The pressure probes at these locations can measure the time-varying pressure signal, which can then be converted to frequency domain using FFT. SPL can then be computed for all constituent frequencies at these microphone locations. This can facilitate the visualization of the variation of SPL at all these locations, for example, along the hemispherical surface, with frequency (St.). This can also facilitate visualization of asymmetric sound fields generated. As can be seen from the plots shown in FIG. 12, there can be a slight decrease (e.g., approximately 5 dB) in the peak SPL for microphones facing the microjet. This asymmetry can be used to perform targeted noise reduction along a specific direction with minimal thrust impact. Moreover, as shown in the exemplary images/diagrams of FIG. 12, there can be a significant spatial redistribution of acoustic energy as the peak noise zone can be shifted away from the direction of injection and the regions of lows (e.g., areas 1205) and highs (e.g., areas 1210) can be replaced by a more uniform average (e.g., areas 1215).

Exemplary Design Vs Operational Asymmetry

Figure 13A:
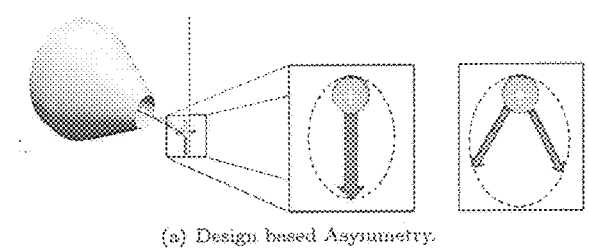
FIG. 13A is an exemplary diagram/illustration of a design-based asymmetry for the exemplary nozzle according to an exemplary embodiment of the present disclosure.
Figure 13B:
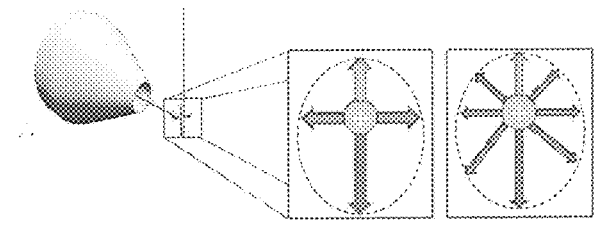
FIG. 13B is an exemplary diagram/illustration of an operational asymmetry for another exemplary nozzle (e.g., an add core nozzle) according to an exemplary embodiment of the present disclosure.
Figure 15A:
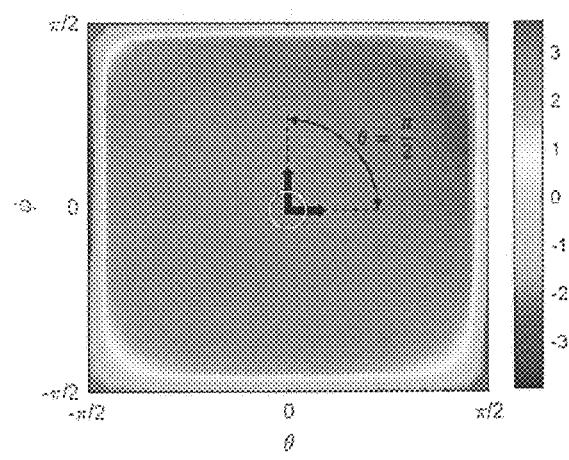
FIG. 15A is an exemplary sound diagram/illustration for an exemplary uniform hemispherical microphone in far field for design-based asymmetry according to an exemplary embodiment of the present disclosure.
Figure 15B:
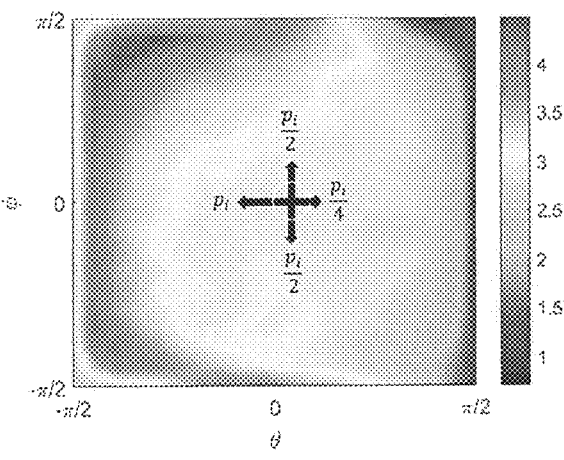
FIG. 15B is an exemplary sound diagram/illustration for the exemplary uniform hemispherical microphone in far field for operational asymmetry according to an exemplary embodiment of the present disclosure.

The exemplary noise reduction system can utilize various downstream injection setups. For example, as shown in the diagram of FIG. 13A, an exemplary design-based asymmetry can be used where multiple injection ports can be placed asymmetrically about the jet axis. For example, this can include two injection ports separated by an angle θ(θ≠π). The exemplary flow setup/configuration arising from such exemplary injection procedure can have stream-wise vorticity and localized enhanced mixing in the quadrant facing the microjets (see, e.g., contour plot shown in FIG. 14A), while negligible mixing enhancement can be observed on the opposite side. Additionally, as shown in the diagram of FIG. 13B, the exemplary operational asymmetry can be utilized, which can include symmetrically-located microjet injection ports (e.g., about the jet axis) but operating at unequal injection pressure ratios, leading to a controlled asymmetric fluidic injection about the jet axis. (See, e.g., contour plot shown in FIG. 14B). Such exemplary flow setup/configuration can have a weighted mixing enhancement across the azimuth such that the area facing the microjet with a higher injection pressure can have higher stream-wise vorticity generation and more mixing compared to the area facing microjets with lower injection pressure. Both these exemplary injection procedures can lead to noise reduction in the near-field and far-field. (See e.g., sound diagrams/illustrations shown in FIGS. 15A and 15B). Depending on the noise reduction and thrust parameters, any one of these exemplary injection procedures can be deployed. However, from an operations perspective, it can be preferable to have a symmetric distribution of microjet ports and have the capability to control individual microjets so as to create an operational asymmetry. This can have the added benefit of switching to an axi-symmetric injection setup/configuration, if needed. (See, e.g., Reference 90).

The viability of asymmetric fluid injection downstream of a nozzle exhaust as a means to induce asymmetry in the acoustic field can be analyzed. This induced asymmetry due to enhanced mixing in a particular direction can suppress the far field noise along a target direction. A directional noise suppression of about approximately 5 dB in the target direction can be observed in the numerical tests conducted so far.

An exemplary advantage of the exemplary system according to the exemplary embodiments of the present disclosure can be its operational flexibility. Such exemplary flexibility of the exemplary system can effectuate a directional modification of the jet plume without the presence of any structural asymmetry compared to other structurally asymmetric procedures. For example, as the enhanced mixing can be closer to the jet axis, its effect on the jet plume symmetry and the direction of primary thrust can be minimal. Moreover, compared to symmetric injection procedures, similar far-field noise reduction can be achieved for a particular direction (e.g., towards the ground in case of an aircraft) with substantially lower injections.

Multiple asymmetric microjet injections can assist to optimize the injection parameters for the same acoustic benefits, or tailor the domain of influence as per requirements by reshaping the plume and spatial distribution of acoustic energy. There can be multiple mutually exclusive sets of optimized design and operating parameters for different stages of the flight such as take-off, cruise and landing, each with its own thrust characteristics. Such parametric investigations can help provide separate design and operating parameters desirable for stable and reliable operation during different stages of the flight. For example, blockerless thrust reversers based on fluid injection have already been proposed in multiple previous studies, (see, e.g., Reference 90), thus the nozzle-injector configuration with the highest thrust impact can be used during the operation of similar thrust reversers. This can lead to substantial noise reduction during the landing roll.

Figure 16:
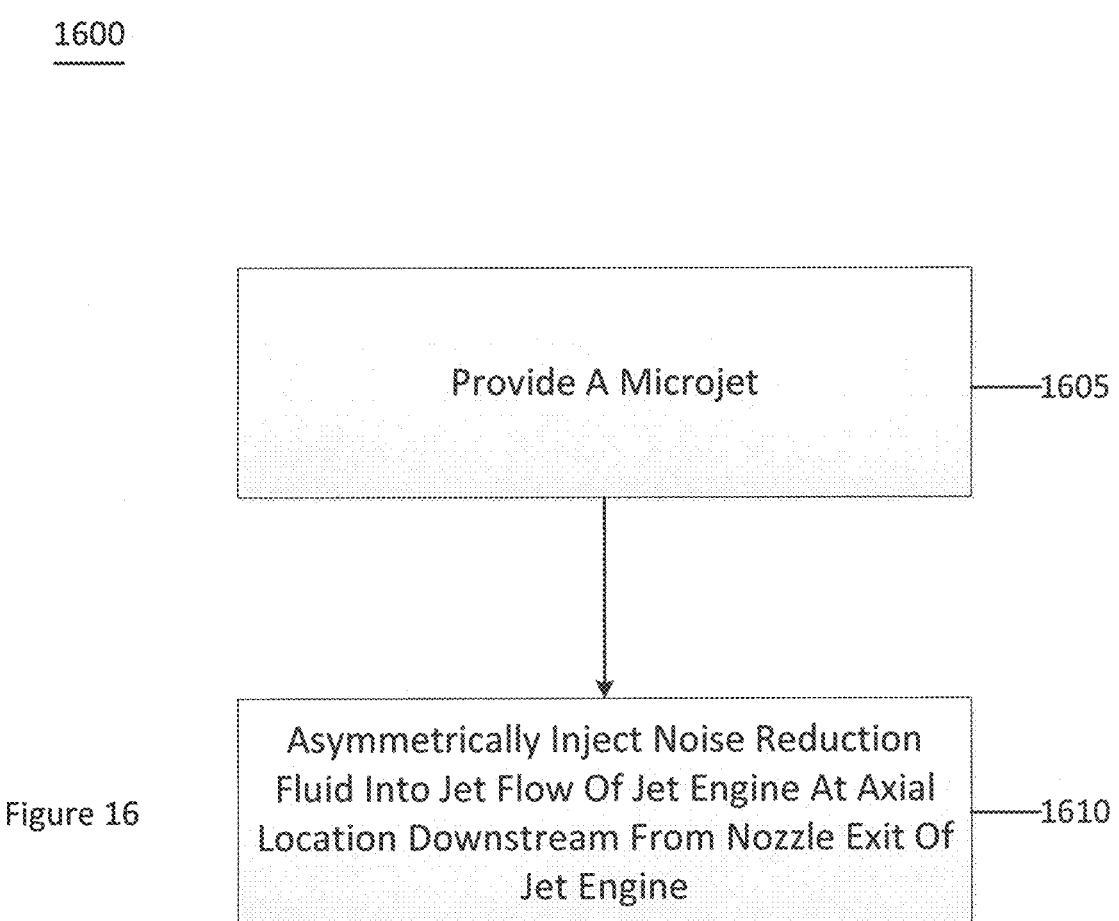
FIG. 16 is an exemplary flow diagram of a method for reducing noise from the jet engine according to an exemplary embodiment of the present disclosure.

FIG. 16 shows an exemplary flow diagram of a method 1600 for reducing noise from a jet engine according to an exemplary embodiment of the present disclosure. For example, at procedure 1605 at least one microjet can be provided. At procedure 1610, a noise reduction fluid can be asymmetrically injected into a jet flow of the jet engine at an axial location downstream from a nozzle exit of the jet engine, which can include asymmetrically injecting the noise reduction fluid in a direction that is normal with respect to the jet flow.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.

[1] Alkislar, Mehmet B., Anjaneyulu Krothapalli, and G. W. Butler. "The effect of streamwise vortices on the aeroacoustics of a Mach 0.9 jet." *Journal of Fluid Mechanics* 578 (2007): 139-169.

[2] Alkislar, Mehmet. "Aeroacoustics of a Mach 0.9 jet with Chevron-microjet combination." In 14*th AIAA/CEAS Aeroacoustics Conference (29th AIAA Aeroacoustics Conference)*, p. 3041. 2008.

[3] Brausch, J. F., and V. L. Doyle. "Supersonic Transport Noise Reduction Technology Summary Phase I. Summary of GE4/SST Acoustic Suppression Research." *Report FAA-SS*(1972): 72-42.

[4] Bridges, James, and Clifford Brown. "Parametric testing of chevrons on single flow hot jets." In 10*th AIAA/CEAS Aeroacoustics Conference*, p. 2824. 2004.

[5] Burge, H. L., S. Lieberman, and L. Manson. "A study of the use of liquid base foams for jet noise reduction." (1971).

[6] Chenault, Clarence, John Dorri, David Smith, and Valdis Kibens. "Active core exhaust (ACE) control for reduction of thermal loading." In *Fluids* 2000 *Conference and Exhibit*, p. 2471. 2000.

[7] Callender, Bryan, Ephraim Gutmark, and Steven Martens. "A comprehensive study of fluidic injection technology for jet noise reduction." In 13*th AIAA/CEAS Aeroacoustics Conference (28th AIAA Aeroacoustics Conference)*, p. 3608. 2007.

[8] Camussi, Roberto, Giulio Guj, Francesco Tomassi, Pengyuan Yao, Aldo Pieroni, and Renata Sisto. "Air injection through microjets in low Mach number turbulent jet flows." In 13*th AIAA/CEAS Aeroacoustics Conference (28th AIAA Aeroacoustics Conference)*, p. 3644. 2007.

[9] Camussi, Roberto, Giulio Guj, Francesco Tomassi, and Renata Sisto. "Effect of air injection on the far field pressure radiated from a jet at subsonic Mach numbers." *International Journal of Aeroacoustics* 7, no. 1 (2008): 69-82.

[10] Castelain, Thomas, Michel Sunyach, Jean-Christophe Bera, and Jean-Christophe B'era. "Effect of microjets on a high-subsonic jet. Parametric study of far-field noise reduction." In 12*th AIAA/CEAS Aeroacoustics Conference (27th AIAA Aeroacoustics Conference)*, p. 2705. 2006.

[11] Casalino, D., F. Diozzi, R. Sannino, and A. Paonessa. "Aircraft noise reduction technologies: a bibliographic review." *Aerospace Science and Technology* 12, no. 1 (2008): 1-17.

[12] Chauvet, Nicolas, Sebastien Deck, and Laurent Jacquin. "Numerical study of mixing enhancement in a supersonic round jet." *AIAA journal* 45, no. 7 (2007): 1675-1687.

[13] Castelain, Thomas, Michel Sunyach, Daniel Juve, and J-C. Bera. "Jet-noise reduction by impinging microjets: an acoustic investigation testing microjet parameters." *AIAA journal* 46, no. 5 (2008): 1081-1087.

[14] Caeti, Ryan B., and Iraj M. Kalkhoran. "Jet noise reduction via fluidic injection." *AIAA journal* 52, no. 1 (2013): 26-32.

[15] Davis, M. R. "Variable control of jet decay." *Aiaa Journal* 20, no. 5 (1982): 606-609.

[16] Gaeta, R., K. Ahuja, D. Schein, and W. Solomon. "Large jet-noise reductions through distributed nozzles." In 8*th AIAA/CEAS Aeroacoustics Conference & Exhibit*, p. 2456. 2002.

[17] Greska, Brenton, Anjaneyulu Krothapalli, Nathan Burnside, and William Home. "High-speed jet noise reduction using microjets on a jet engine." In 10*th AIAA/CEAS Aeroacoustics Conference*, p. 2969. 2004.

[18] Greska, Brenton, Anjaneyulu Krothapalli, John Seiner, Bernard Jansen, and Lawrence Ukeiley. "The effects of microjet injection on an F404 jet engine." In 11*th AIAA/CEAS Aeroacoustics Conference*, p. 3047. 2005.

[19] Greska, Brenton, and Anjaneyulu Krothapalli. "Jet noise reduction using aqueous microjet injection." In 10*th AIAA/CEAS Aeroacoustics Conference*, p. 2971. 2004.

[20] Grosch, Chester E., J. M. Seiner, M. Y. Hussaini, and T. L. Jackson. "Numerical simulation of mixing enhancement in a hot supersonic jet." *Physics of Fluids* 9, no. 4 (1997): 1125-1143.

[21] Henderson, Brenda. "Fifty years of fluidic injection for jet noise reduction." *International Journal of Aeroacoustics* 9, no. 1-2 (2010): 91-122.

[22] Ibrahim, Mohammed K., Ryoji Kunimura, and Yoshiaki Nakamura. "Mixing enhancement of compressible jets by using unsteady microjets as actuators." *AIAA journal* 40, no. 4 (2002): 681688.

[23] Kandula, Max, and Michael Lonergan. "Estimation of broadband shock noise reduction in turbulent jets by water injection." In 14*th AIAA/CEAS Aeroacoustics Conference (29th AIAA Aeroacoustics Conference)*, p. 3064. 2008.

[24] Kandula, Max, and Michael Lonergan. "Effective jet properties for the estimation of turbulent mixing noise reduction by water injection." In 13*th AIAA/CEAS Aeroacoustics Conference (28th AIAA Aeroacoustics Conference)*, p. 3645. 2007.

[25] Kandula, Max. "Prediction of turbulent jet mixing noise reduction by water injection." *AIAA journal* 46, no. 11 (2008): 2714-2722.

[26] Krothapalli, A., L. Venkatakrishnan, L. Lourenco, B. Greska, and R. Elavarasan. "Turbulence and noise suppression of a high-speed jet by water injection." *Journal of Fluid Mechanics* 491(2003): 131-159.

[27] Krothapalli, A., L. Venkatakrishnan, L. Lourenco, B. Greska, and R. Elavarasan. "Turbulence and noise suppression of a high-speed jet by water injection." *Journal of Fluid Mechanics* 491(2003): 131-159.

[28] Kibens, Valdis, John Dorris, III, David Smith, and Michael Mossman. "Active flow control technology transition—The Boeing ACE program." In 30*th Fluid Dynamics Conference*, p. 3507. 1999.

[29] Lardeau, Sylvain, Eric Lamballais, and Jean-Paul Bonnet. "Direct numerical simulation of a jet controlled by fluid injection." *Journal of turbulence* 3 (2002): N2.

[30] Mel'nikov, B. N., V. I. Tokarev, and I. P. Shmakov. "Snizhenie shuma turblentnoi strui metodom vduva vtorichnogo vozdukha." *Samoletostroenie i Tekhnika Vozdushnogo Flotal*8 (1970): 28-30.

[31] Manson, Lidia, and H. L. Burge. "Jet-Noise Reduction through Liquid-Base Foam Injection." *The Journal of the Acoustical Society of America* 50, no. 4A (1971): 1067-1074.

[32] Norum, Thomas. "Reductions in multi-component jet noise by water injection." In 10*th AIAA/CEAS Aeroacoustics Conference*, p. 2976. 2004.

[33] Papamoschou, Dimitri. "New method for jet noise reduction in turbofan engines." *AIAA journal* 42, no. 11 (2004): 2245-2253.

[34] Papamoschou, Dimitri, and D. G. Hubbard. "Visual observations of supersonic transverse jets." *Experiments in Fluids* 14, no. 6 (1993): 468-476.

[35] Parekh, D., V. Kibens, A. Glezer, J. Wiltse, and D. Smith. "Innovative jet flow control-mixing enhancement experiments." In 34*th Aerospace Sciences Meeting and Exhibit*, p. 308. 1996.

[36] Powell, Alan. "The influence of the exit velocity profile on the noise of a jet." *The Aeronautical Quarterly* 4, no. 4 (1954): 341-360.

[37] Rajput, Pankaj, Sunil Kumar, and Iraj Kalkhoran. "Noise Reduction for an Unheated Mach 0.9 Jet by Fluidic Injection." In 23*rd AIAA/CEAS Aeroacoustics Conference*, p. 3857. 2017.

[38] Raman, Ganesh, and David Cornelius. "Jet mixing control using excitation from miniature oscillating jets." *AIAA journal* 33, no. 2 (1995): 365-368.

[39] Raman, Ganesh. "Using controlled unsteady fluid mass addition." *AIAA journal* 35, no. 4 (1997): 647-656.

[40] Samimy, M., K. B. M. Q. Zaman, and M. F. Reeder. "Effect of tabs on the flow and noise field of an axisymmetric jet." *AIAA journal* 31, no. 4 (1993): 609-619.

[41] Semrau, W. R. *RESEARCH ON JET NOISE GENERATION AND SUPPRESSION.* GENERAL ELECTRIC CO CINCINNATI OHIO ADVANCED ENGINE AND TECHNOLOGY DEPT, 1964.

[42] STRINGAS, E., and R. Mani. "Aircraft/engine jet noise control-A survey." In 6*th Aircraft Design, Flight Test and Operations Meeting*, p. 947. 1974.

[43] Viswanathan, Krishna. "Nozzle shaping for reduction of jet noise from single jets." *AIAA journal* 43, no. 5 (2005): 1008-1022.

[44] Viswanathan, Krishna. "Elegant concept for reduction of jet noise from turbofan engines." *Journal of Aircraft* 43, no. 3 (2006): 616-626.

[45] Zaman, Khairul. "Subsonic jet noise reduction by microjets with various injection port geometry." In 13*th AIAA/CEAS Aeroacoustics Conference (28th AIAA Aeroacoustics Conference)*, p. 3643. 2007.

[46] Rajput, Pankaj and Kumar, Sunil. "Directionally Targeted Jet Noise Reduction System."

[47] Lawton, R. N. and Fujiwara, D., "Living with aircraft noise: Airport proximity, aviation noise and subjective wellbeing in England," *Transportation Research Part D: Transport and Environment*, Vol. 42, 2016, pp. 104-118.

[48] Kaltenbach, M., Maschke, C., Heß, F., Niemann, H., and Führ, M., "Health Impairments, Annoyance and Learning Disorders Caused by Aircraft Noise," International Journal, Vol. 6, No. 1, 2016, pp. 15-46.

[49] Wolfe, P. J., Malina, R., Barrett, S. R., and Waitz, I. A., "Costs and benefits of US aviation noise land-use policies," Transportation Research Part D: Transport and Environment, Vol. 44, 2016, pp. 147-156.

[50] Henderson, B., "Fifty years of fluidic injection for jet noise reduction," International Journal of Aeroacoustics, Vol. 9, No. 1-2, 2010, pp. 91-122.

[51] Krothapalli, A., Venkatakrishnan, L., Lourenco, L., Greska, B., and Elavarasan, R., "Turbulence and noise suppression of a high-speed jet by water injection," Journal of Fluid Mechanics, Vol. 491, 2003, pp. 131-159.

[52] Castelain, T., Sunyach, M., Juv'e, D., and Bera, J.-C., "Jet-noise reduction by impinging microjets: an acoustic investigation testing microjet parameters," AIAA journal, Vol. 46, No. 5, 2008, pp. 1081-1087.

[53] Huet, M., Fayard, B., Rahier, G., and Vuillot, F., "Numerical investigation of the micro-jets efficiency for jet noise reduction," AIAA paper, Vol. 3127, 2009, pp. 2009.

[54] Seiner, J. and Grosch, C., "Mixing enhancement by tabs in round supersonic jets," 4th AIAA/CEAS Aeroacoustics Conference, 1998, p. 2326.

[55] Zaman, K., "Jet spreading increase by passive control and associated performance penalty," 30th Fluid Dynamics Conference, 1999, p. 3505.

[56] Viswanathan, K., "Nozzle shaping for reduction of jet noise from single jets," AIAA journal, Vol. 43, No. 5, 2005, pp. 1008-1022.

[57] Papamoschou, D., "Fan flow deflection in simulated turbofan exhaust," AIAA journal, Vol. 44, No. 12, 2006, pp. 3088-3097.

[58] Johnson, A., Xiong, J., Rostamimonjezi, S., Feng, L., and Papamoschou, D., "Aerodynamic and acoustic optimization for fan flow deflection," 49th AIAA Aerospace Sciences Meeting including the New Horizons Forum and Aerospace Exposition, 2011, p. 1156.

[59] Papamoschou, D., "New method for jet noise reduction in turbofan engines," AIAA journal, Vol. 42, No. 11, 2004, pp. 2245-2253.

[60] Rajput, P. and Kumar, S., "Directional Noise Reduction via Asymmetric Downstream Fluidic Injection," ASME 2017 International Mechanical Engineering Congress and Exposition, American Society of Mechanical Engineers, 2017, pp. V001T03A026-V001T03A026.

[61] Caeti, R. B. and Kalkhoran, I. M., "Jet Noise Reduction via Fluidic Injection," AIAA journal, Vol. 52, No. 1, 2013, pp. 26-32.

[62] Rajput, P., Kumar, S., and Kalkhoran, I., "Noise Reduction for an Unheated Mach 0.9 Jet by Fluidic Injection," 23rd AIAA/CEAS Aeroacoustics Conference, 2017, p. 3857.

[63] Rajput, P. and Kumar, S., "Jet Noise Reduction by Downstream Fluidic Injection: Effect of Injection Pressure Ratio and Number of Injection Ports," 2018 AIAA Aerospace Sciences Meeting, 2018, p. 0258.

[64] Bridges, J. and Brown, C. A., "Validation of the small hot jet acoustic rig for aeroacoustic research," AIAA Paper, Vol. 2846, 2005, pp. 2005.

[65] Leonard, A., "Energy cascade in large-eddy simulations of turbulent fluid flows," Advances in geophysics, Vol. 18, 1975, pp. 237-248.

[66] Favre, A., "EQUATIONS DES GAZ TURBULENTS COMPRESSIBLES. 2. METHODE DES VITESSES MOYENNES METHODE DES VITESSES MACROSCOPIQUES PONDEREES PAR LA MASSE VOLUMIQUE," Journal de mecanique, Vol. 4, No. 4, 1965, pp. 391.

[67] Martin, M. P., Piomelli, U., and Candler, G. V., "Sub-grid-scale models for compressible large-eddy simulations," Theoretical and Computational Fluid Dynamics, Vol. 13, No. 5, 2000, pp. 361-376.

[68] Smagorinsky, J., "General circulation experiments with the primitive equations: I. the basic experiment*," Monthly weather review, Vol. 91, No. 3, 1963, pp. 99-164.

[69] Kurganov, A., Noelle, S., and Petrova, G., "Semidiscrete central-upwind schemes for hyperbolic conservation laws and Hamilton-Jacobi equations," SIAM Journal on Scientific Computing, Vol. 23, No. 3, 2001, pp. 707-740.

[70] Lighthill, M. J., "On sound generated aerodynamically. I. General theory," Proceedings of the Royal Society of London A: Mathematical, Physical and Engineering Sciences, Vol. 211, The Royal Society, 1952, pp. 564-587.

[71] Lighthill, M. J. and Whitham, G. B., "On kinematic waves. II. A theory of traffic flow on long crowded roads," Proceedings of the Royal Society of London A: Mathematical, Physical and Engineering Sciences, Vol. 229, The Royal Society, 1955, pp. 317-345.

[72] Williams, J. E., Some thoughts on the effects of aircraft motion and eddy convection on the noise from air jets, University of Southampton, Department of Aeronautics & Astronautics, 1960.

[73] Williams, J. F., "The noise from turbulence convected at high speed," Philosophical Transactions of the Royal Society of London A: Mathematical, Physical and Engineering Sciences, Vol. 255, No. 1061, 1963, pp. 469-503.

[74] Ribner, H., "The generation of sound by turbulent jets," Advances in applied mechanics, Vol. 8, 1964, pp. 103-182.

[75] Ribner, H. S., "Quadrupole correlations governing the pattern of jet noise," Journal of Fluid Mechanics, Vol. 38, No. 01, 1969, pp. 1-24.

[76] Goldstein, M. and Rosenbaum, B., "Effect of anisotropic turbulence on aerodynamic noise," The Journal of the Acoustical Society of America, Vol. 54, No. 3, 1973, pp. 630-645.

[77] Williams, J. F. and Maidanik, G., "The Mach wave field radiated by supersonic turbulent shear flows," Journal of Fluid Mechanics, Vol. 21, No. Part 4, 1965, pp. 641-657.

[78] Lush, P., "Measurements of subsonic jet noise and comparison with theory," Journal of Fluid Mechanics, Vol. 46, No. 03, 1971, pp. 477-500.

[79] Phillips, O. M., "On the generation of sound by supersonic turbulent shear layers," Journal of Fluid Mechanics, Vol. 9, No. 01, 1960, pp. 1-28.

[80] Lilley, G., "On the noise from jets," Agard cp-131, Vol. 13, 1974, pp. 12.
[81] Goldstein, M. E., "Aeroacoustics," New York, McGraw-Hill International Book Co., 1976. 305 p., Vol. 1, 1976.
[82] Tester, B. and Morfey, C., "Developments in jet noise modellingtheoretical predictions and comparisons with measured data," Journal of Sound and Vibration, Vol. 46, No. 1, 1976, pp. 79-103.
[83] Curie, N., "The influence of solid boundaries upon aerodynamic sound," Proceedings of the Royal Society of London A: Mathematical, Physical and Engineering Sciences, Vol. 231, The Royal Society, 1955, pp. 505-514.
[84] Mendez, S., Shoeybi, M., Sharma, A., Lele, S., and Moin, P., "Post-processing of large-eddy simulations for jet noise predictions," Center for Turbulence Research Annual Research Briefs, Vol. 2009, 2009.
[85] Lau, J. C., Morris, P. J., and Fisher, M. J., "Measurements in subsonic and supersonic free jets using a laser velocimeter," Journal of Fluid Mechanics, Vol. 93, No. 1, 1979, pp. 1-27.
[86] Arakeri, V., Krothapalli, A., Siddavaram, V., Alkislar, M., and Lourenco, L., "On the use of microjets to suppress turbulence in a Mach 0.9 axisymmetric jet," Journal of Fluid mechanics, Vol. 490, 2003, pp. 75-98.
[87] Rajput, P. and Kalkhoran, I., "Continuous Radial Jet in Annular Cross-flow," 33rd AIAA Applied Aerodynamics Conference. Dallas, Tex., 2015.
[88] K, M., "The Interaction of Jets with Crossflow," Annual Review of Fluid Mechanics, Vol. 45, 2013, pp. 379-407.
[89] Rajput, P. and Kalkhoran, I. M., "Computational Analysis and Optimization of Blockerless Engine Thrust Reverser Concept," 54th AIAA Aerospace Sciences Meeting, 2016, p. 0293.
[90] Rajput, P. and Kalkhoran, I., "Optimization of Blockerless Engine Thrust Reverser," Journal of Propulsion and Power, 2016, pp. 1-14.

What is claimed is:

1. An engine noise reduction system, comprising:
a noise reduction fluid source; and
at least one microjet (i) placed at an axial location downstream from a nozzle exit of an engine, (ii) placed on at least one of a center body of the engine or an injection tube on an axis of the engine, and (iii) configured to asymmetrically inject a noise reduction fluid from the noise reduction fluid source into a jet flow of the engine.

2. The engine noise reduction system of claim 1, wherein the engine is a jet engine.

3. The engine noise reduction system of claim 1, wherein the at least one microjet includes four microjets.

4. The engine noise reduction system of claim 3, wherein the four microjets are about 90 degrees apart in a plane at the axial location.

5. The engine noise reduction system of claim 3, wherein the four microjets are asymmetric microjets.

6. The engine noise reduction system of claim 1, wherein the at least one microjet is configured to inject the noise reduction fluid in a direction that is normal with respect to the jet flow.

7. The engine noise reduction system of claim 1, wherein the at least one microjet has a circular shape.

8. The engine noise reduction system of claim 1, wherein the at least one microjet is concentric with the engine.

9. The engine noise reduction system of claim 1, wherein the at least one microjet is configured to inject the noise reduction fluid in a non-parallel direction with respect to the jet flow.

10. The engine noise reduction system of claim 1, wherein the noise reduction fluid includes a high momentum fluid.

11. The engine noise reduction system of claim 1, wherein the at least one microjet is configured to inject the noise reduction fluid radially outward from a centerline or the axis.

12. The engine noise reduction system of claim 1, wherein the at least one microjet includes a plurality of microjets, and wherein at least two of the at least one microjet are asymmetrically distributed on the at least one of the center body of the engine or the injection tube on the axis of the engine.

13. The engine noise reduction system of claim 1, wherein the at least one microjet includes a plurality of microjets, and wherein at least one of an injection pressure or an injection flow rate of the noise reduction fluid is different between at least two of the plurality of microjets.

14. A jet engine noise reduction system, comprising:
at least one jet engine; and
at least one microjet (i) placed at an axial location downstream from a nozzle exit of the at least one jet engine, (ii) placed on at least one of a center body of the at least one jet engine or an injection tube on an axis of the at least one jet engine, and (iii) configured to asymmetrically inject a noise reduction fluid into a jet flow of the at least one jet engine.

15. The jet engine noise reduction system of claim 14, wherein the at least one microjet includes four microjets placed about 90 degrees apart in a plane at the axial location.

16. The jet engine noise reduction system of claim 14, wherein at least one microjet is configured to inject the noise reduction fluid in a direction that is normal with respect to a jet flow of the jet engine.

17. The jet engine noise reduction system of claim 14, wherein at least one jet engine has a serrated edge.

18. The jet engine noise reduction system of claim 14, wherein the at least one microjet is configured to inject the noise reduction fluid in a non-parallel direction with respect to the jet flow.

19. The jet engine noise reduction system of claim 14, wherein the noise reduction fluid includes a high momentum fluid.

20. The jet engine noise reduction system of claim 14, wherein the at least one microjet is configured to inject the noise reduction fluid radially outward from a centerline or the axis.

21. A method for reducing noise from a jet engine, comprising:
providing at least one microjet placed on at least one of a center body of the jet engine or an injection tube on an axis of the jet engine; and
asymmetrically injecting a noise reduction fluid into a jet flow of the jet engine at an axial location downstream from a nozzle exit of the jet engine.

22. The method of claim 21, wherein the at least one microjet includes four microjets.

23. The method of claim 22, wherein the four microjets are about 90 degrees apart in a plane at the axial location.

24. The method of claim 21, wherein the asymmetrically injecting the noise reduction fluid includes asymmetrically injecting the noise reduction fluid in a direction that is normal with respect to the jet flow.

25. The method of claim 21, wherein the noise reduction fluid is radially injected radially outward from a centerline or the axis.

\* \* \* \* \*